(12) United States Patent
Bair et al.

(10) Patent No.: US 11,612,837 B2
(45) Date of Patent: Mar. 28, 2023

(54) FILTER WITH INTERCONNECTED HOLLOW ELEMENTS AND METHOD OF USE

(71) Applicant: Pall Corporation, Port Washington, NY (US)

(72) Inventors: James A. Bair, Cortland, NY (US); Eddie J. Sturdevant, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 319 days.

(21) Appl. No.: 17/025,163

(22) Filed: Sep. 18, 2020

(65) Prior Publication Data
US 2022/0088510 A1 Mar. 24, 2022

(51) Int. Cl.
*B01D 29/33* (2006.01)
*B01D 29/52* (2006.01)

(52) U.S. Cl.
CPC ............ *B01D 29/33* (2013.01); *B01D 29/52* (2013.01); *B01D 2201/02* (2013.01);
(Continued)

(58) Field of Classification Search
CPC .... B01D 29/33; B01D 29/52; B01D 2201/02; B01D 2201/30; B01D 2201/4038;
(Continued)

(56) References Cited

U.S. PATENT DOCUMENTS

| 3,746,642 A | 7/1973 | Bergstrom |
| 4,637,875 A * | 1/1987 | Semler, Jr. ............. B01D 29/15 210/232 |

(Continued)

FOREIGN PATENT DOCUMENTS

| CA | 2 808 323 A1 | 2/2012 |
| CA | 2 951 896 A1 | 6/2017 |

(Continued)

OTHER PUBLICATIONS

Chinese National Intellectual Property Administration, Office Action in counterpart Chinese Patent Application No. 202111097333.7, dated Sep. 19, 2022.

(Continued)

*Primary Examiner* — Waqaas Ali
(74) *Attorney, Agent, or Firm* — Leydig, Voit & Mayer, Ltd.

(57) ABSTRACT

Filters comprising a filter arm comprising a plurality of hollow elements in fluid communication with each other, the hollow elements having porous walls, the filter arm having a first and a second end; a hollow transition element comprising a collector having a side wall, a central cavity, an upper closed end and a lower open end; and a hollow transition element arm having a first and a second transition arm end, and a porous side wall; wherein the first transition arm end is in fluid communication with the second end of the filter arm; and the second transition arm is connected to the side wall of the collector, and is in fluid communication with the central cavity of the collector; and, a hollow base having a side wall, and a base outlet port, wherein the hollow base connected to, and in fluid communication with, the collector; filter devices including the filters, and methods of filtration using the filters, are disclosed.

20 Claims, 19 Drawing Sheets

Figure 1A:
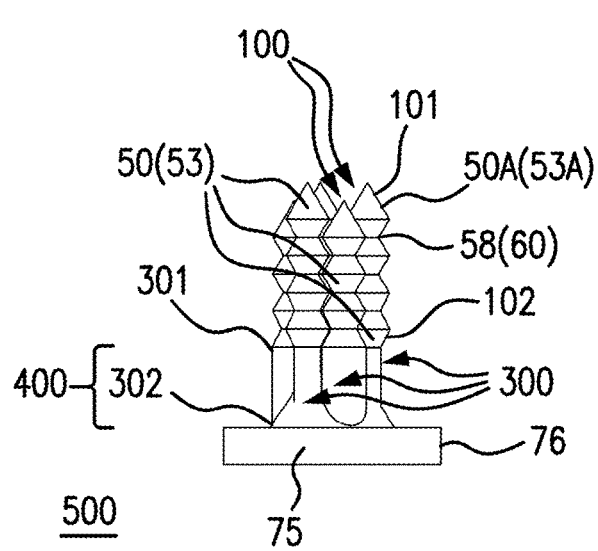

(52) U.S. Cl.
CPC .. *B01D 2201/30* (2013.01); *B01D 2201/4038* (2013.01); *B01D 2201/60* (2013.01); *B01D 2201/607* (2013.01)

(58) Field of Classification Search
CPC .......... B01D 2201/60; B01D 2201/607; B01D 2201/0438; B01D 29/114; B01D 29/54; B01D 35/303; B01D 29/50; B01D 39/14; B01D 35/30; B01D 46/2403
See application file for complete search history.

(56) References Cited

U.S. PATENT DOCUMENTS

| | | | |
|---|---|---|---|
| 5,223,012 A | | 6/1993 | Best et al. |
| 5,972,228 A | | 10/1999 | Ingelman et al. |
| 6,261,469 B1 | | 7/2001 | Zakhidov et al. |
| 6,344,490 B1 | | 2/2002 | DeGeorge et al. |
| 6,620,316 B1 | | 9/2003 | Sakraschinsky et al. |
| 6,773,825 B2 | | 8/2004 | Pickrell et al. |
| 8,695,811 B2 | | 4/2014 | Kang et al. |
| 9,517,939 B2 | | 12/2016 | Braun et al. |
| 10,532,303 B2 | | 1/2020 | Gibson et al. |
| 2002/0194996 A1* | | 12/2002 | Peter .................... B01D 46/84 95/278 |
| 2006/0027510 A1 | | 2/2006 | Rassinger |
| 2009/0174117 A1 | | 7/2009 | Winkler et al. |
| 2010/0326513 A1 | | 12/2010 | Lee et al. |
| 2012/0213926 A1 | | 8/2012 | Lauer et al. |
| 2013/0134081 A1 | | 5/2013 | Kang et al. |
| 2014/0353240 A1 | | 12/2014 | Jung et al. |
| 2015/0328569 A1 | | 11/2015 | Yamada et al. |
| 2016/0002044 A1 | | 1/2016 | Ghosh et al. |
| 2016/0074939 A1 | | 3/2016 | Tanaka et al. |
| 2016/0256801 A1 | | 9/2016 | Hampton et al. |
| 2022/0088527 A1 | | 3/2022 | Zeiler et al. |
| 2022/0088541 A1 | | 3/2022 | Bair et al. |

FOREIGN PATENT DOCUMENTS

| | | |
|---|---|---|
| CN | 101918117 A | 12/2010 |
| CN | 102274650 A | 12/2011 |
| CN | 104661721 A | 5/2015 |
| DE | 840 373 C | 6/1952 |
| DE | 1 934 761 A | 1/1971 |
| DE | 40 17 071 A1 | 11/1991 |
| DE | 299 08 293 U1 | 11/1999 |
| JP | 55-116410 A | 9/1980 |
| JP | 2002-535112 A | 10/2002 |
| JP | 2003-546494 A | 9/2003 |
| JP | 2016-521195 A | 7/2016 |
| JP | 2022-51534 A | 3/2022 |
| JP | 2022-51535 A | 3/2022 |
| KR | 101743355 B1 | 6/2017 |
| SU | 743691 A1 | 6/1980 |
| WO | WO 2011/029568 A1 | 3/2011 |
| WO | WO 2012/012143 A2 | 1/2012 |

OTHER PUBLICATIONS

Japanese Patent Office, Office Action issued in counterpart Japanese Application No. 2021-148926, dated Sep. 6, 2022.
Singapore Intellectual Property Office, Search Report issued in counterpart Singapore Patent Application No. 10202109948R, dated Nov. 10, 2022.
European Patent Office, Extended European Search Report in counterpart European Patent Application No. 21196867.2, dated Jan. 27, 2022.

* cited by examiner

400

400

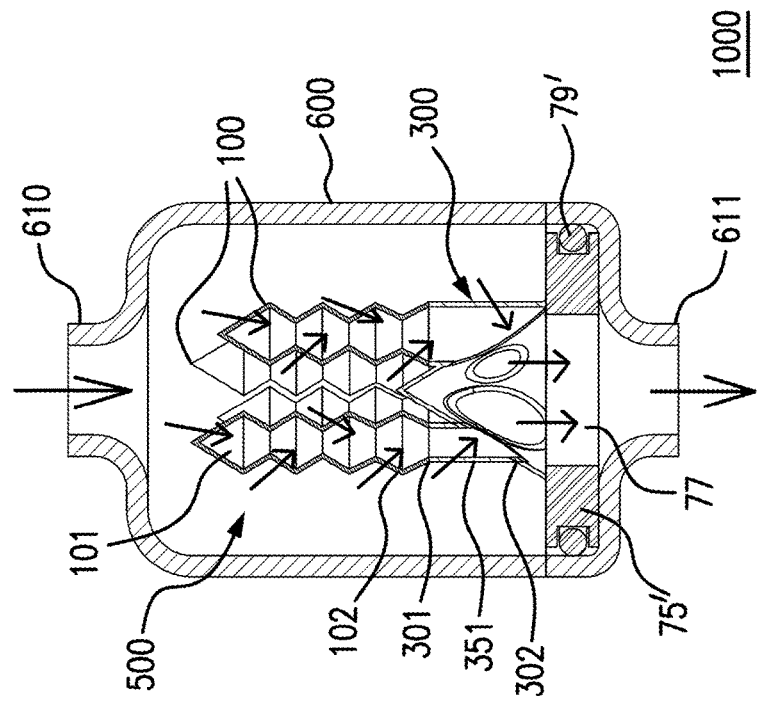
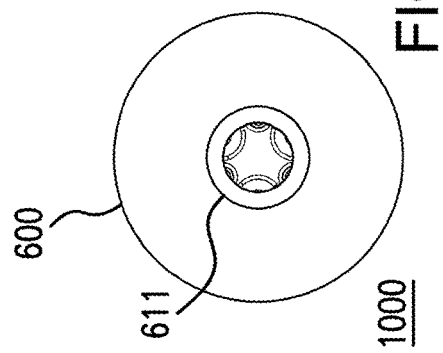
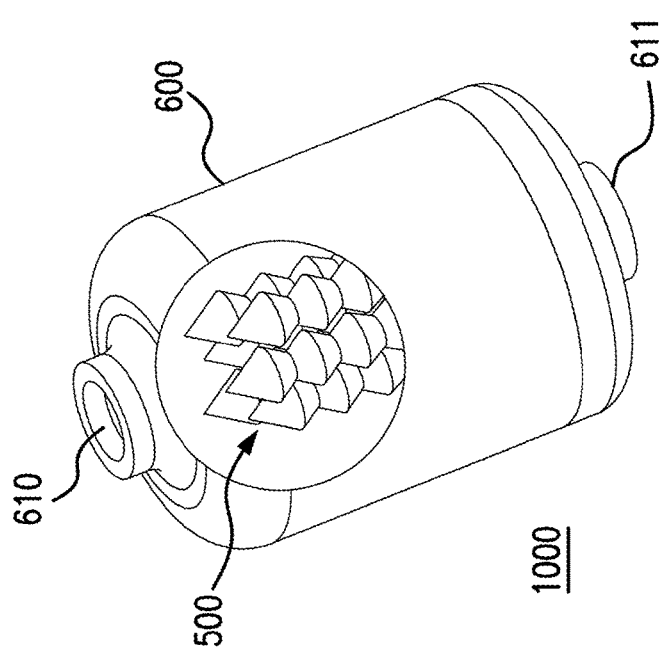
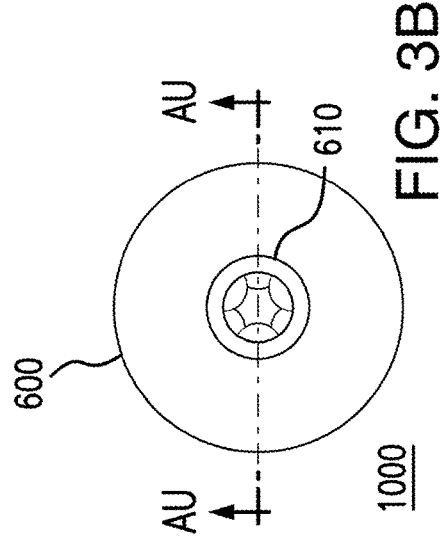
FIG. 3A
FIG. 3B
FIG. 3C
FIG. 3D

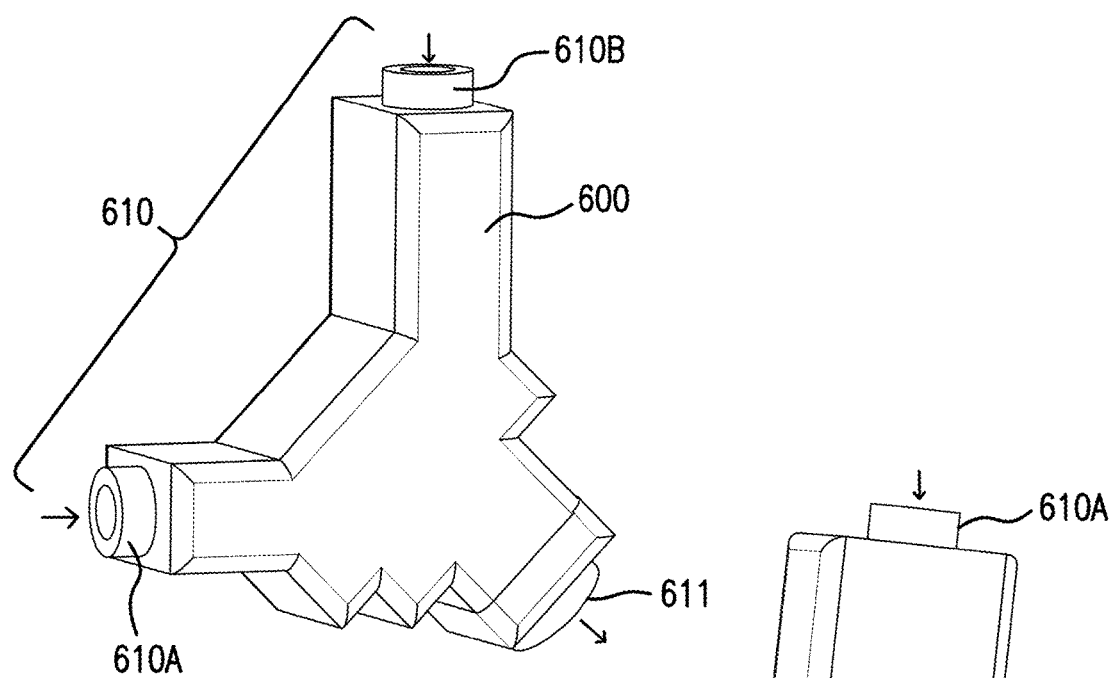
FIG. 7A
FIG. 7B
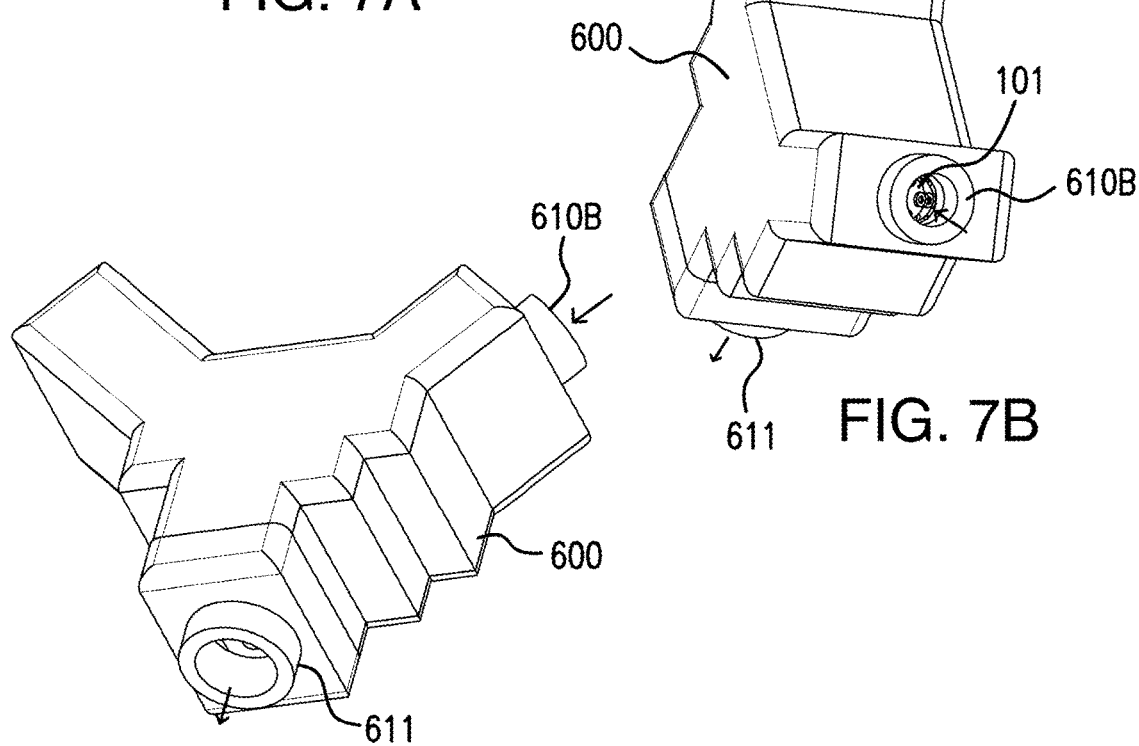
FIG. 7C

FILTER WITH INTERCONNECTED HOLLOW ELEMENTS AND METHOD OF USE

BACKGROUND OF THE INVENTION

In order to achieve filtration performance targets, it may be necessary to use large and/or multiple filtration devices, or use filter devices that have to be replaced more often due to an increase in pressure drop resulting from insufficient filtration area. Either alternative can result in increased cost.

Thus, there is a need for improved filters. The present invention provides for ameliorating at least some of the disadvantages of the prior art. These and other advantages of the present invention will be apparent from the description as set forth below.

BRIEF SUMMARY OF THE INVENTION

An aspect of the invention provides a filter comprising (a) at least one filter arm comprising a plurality of hollow elements in fluid communication with each other, the hollow elements having porous walls, the at least one filter arm having a first end and a second end; (b) a hollow transition element comprising a collector having a porous side wall, a central cavity, an upper closed end and a lower open end; and at least one hollow transition element arm having a first transition arm end, a second transition arm end, and a porous side wall; wherein the first transition arm end is connected to, and in fluid communication with, the second end of the at least one filter arm; and the second transition arm is connected to the side wall of the collector, and is in fluid communication with the central cavity of the collector via at least one aperture in the side wall of the collector; and, (c) a hollow base having a side wall, and a base outlet port, wherein the hollow base is connected to, and in fluid communication with, the collector of the hollow transition element.

In a preferred aspect, the filter comprises a plurality of filter arms, each filter arm having a first end and a second end; and a plurality of hollow transition element arms, each hollow transition element arm having a first transition arm end and a second transition arm end, each second end of a filter arm being connected to, and in fluid communication with, a first transition arm end; each second transition arm end being connected to the side wall of the collector and in fluid communication with the central cavity of the collector via an aperture in the side wall of the collector.

Aspects of the invention include filter devices including aspects of the filters, and methods of filtration using the filters and filter devices.

BRIEF DESCRIPTION OF THE SEVERAL VIEWS OF THE DRAWING(S)

Figure 1C:
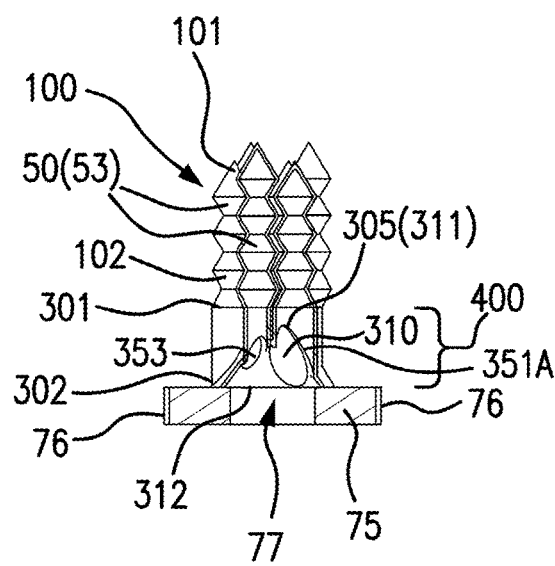
Figure 1B:
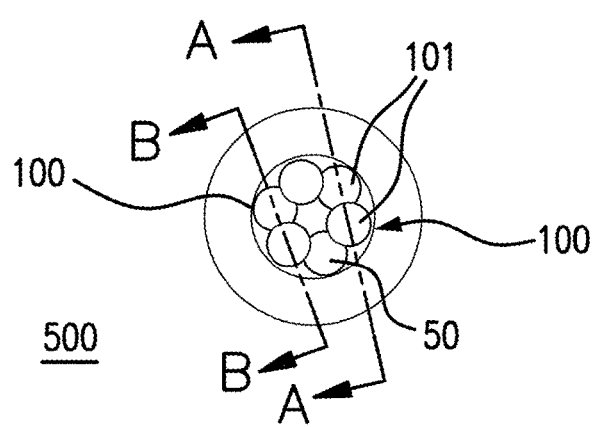
Figure 1D:
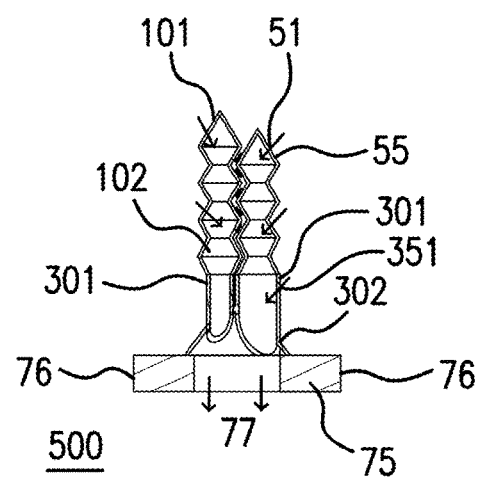
Figure 1E:
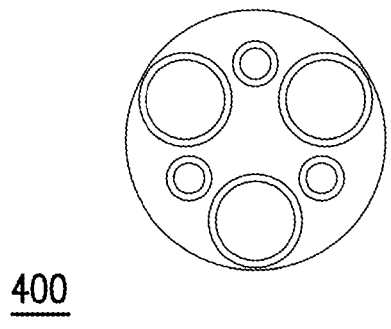
Figure 1F:
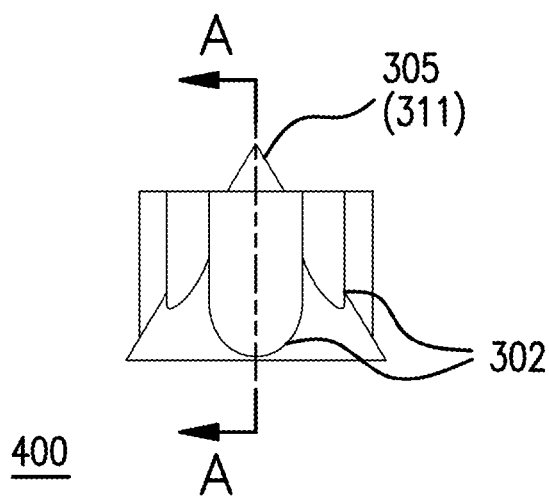
Figure 1G:
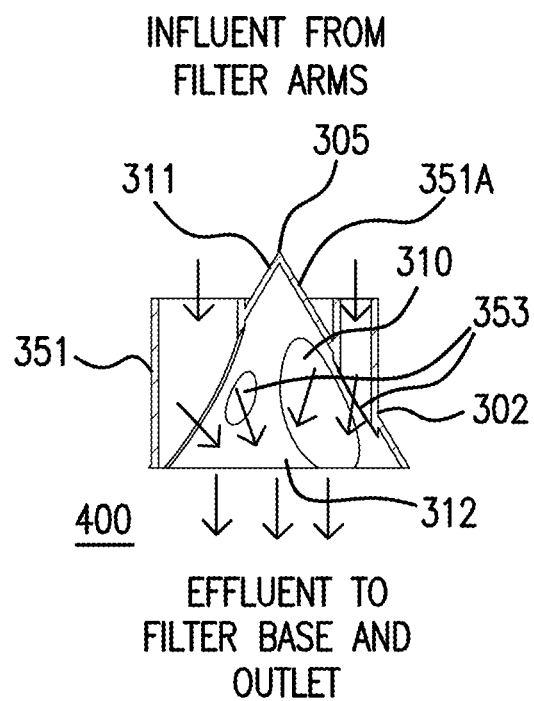

FIG. 1A illustrates a side view of a filter including a plurality of nested filter arms, each filter arm including a plurality of hollow non-rounded elements (each element illustrated as having the shape of opposing cones), each filter arm having a first (upper) end and a second (lower) end; the filter also including a hollow transition element comprising a collector having a porous side wall, a central cavity, an upper closed end and a lower open end; and a plurality of hollow transition element arms, each transition element arm having a first transition arm end, a second transition arm end, and a porous side wall; wherein each first transition arm end is connected to, and in fluid communication with, a second end of a filter arm; and each second transition arm is connected to the side wall of the collector, and is in fluid communication with the central cavity of the collector via an aperture in the side wall of the collector; and, (c) a hollow base having a side wall and a base outlet port, wherein the hollow base is connected to, and in fluid communication with, the lower open end of the collector; FIG. 1B is a top view of the filter shown in FIG. 1A; FIG. 1C is a sectional view along line A-A of FIG. 1B; FIG. 1D is a sectional view along line B-B of FIG. 1B, also showing outside-in filtration flow through the filter arms and the transition element arms; FIG. 1E show a top view of the transition element of the filter shown in FIG. 1A; FIG. 1F is a side view of the transition element; and FIG. 1G is a sectional view of the transition element along line A-A of FIG. 1F.

Figure 2A:
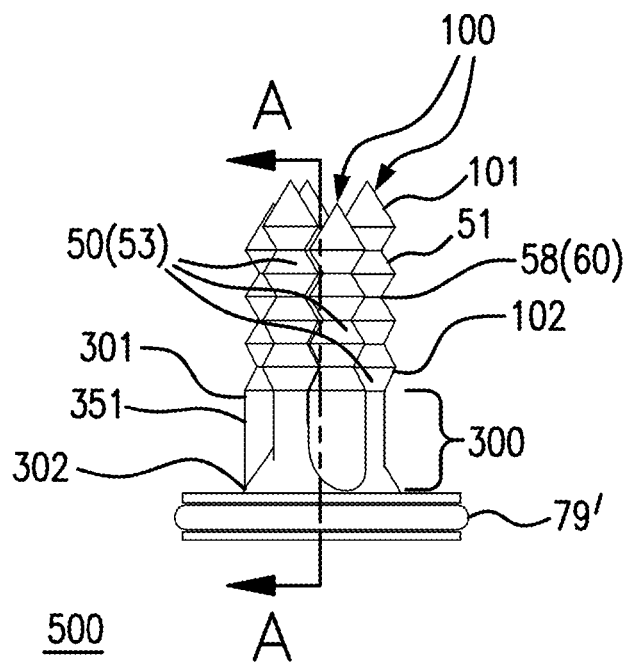
Figure 2B:
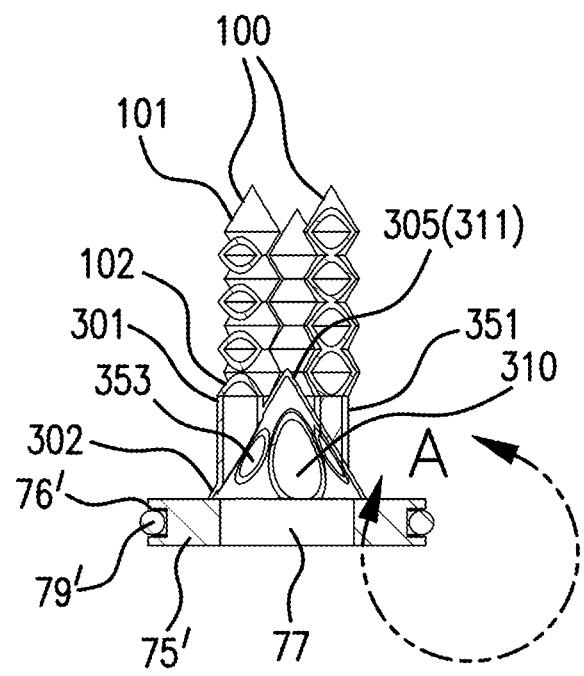
Figure 2C:
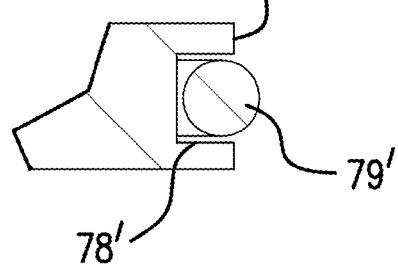
Figure 2D:
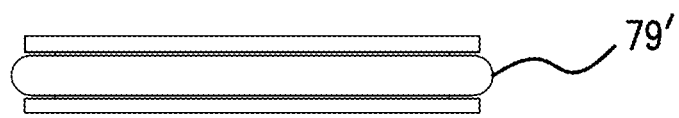
Figure 2E:
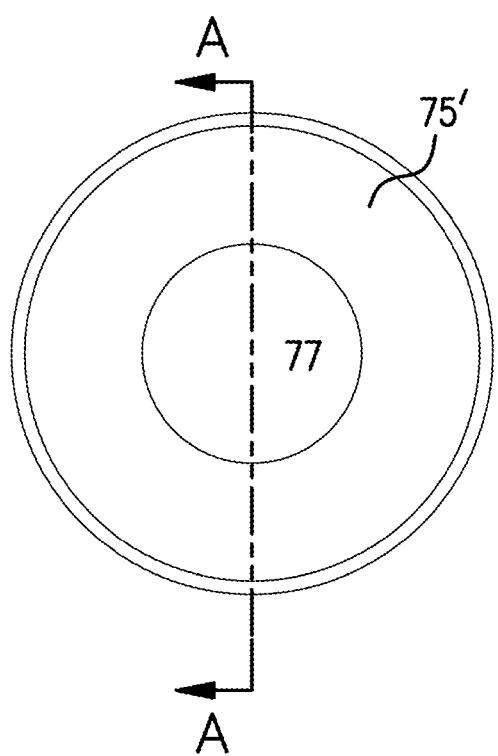
Figure 2F:
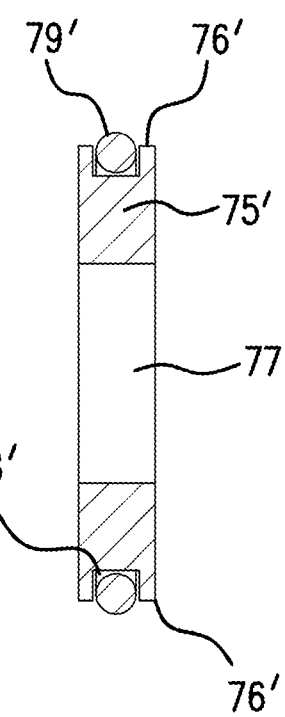

FIGS. 2A-2F show a filter generally similar to the filter shown in FIG. 1A, with the exception that the illustrated base includes a groove in the side wall, and a resilient element such as an o-ring providing a seal arranged in the groove. FIG. 2A shows a side view; FIG. 2B shows a sectional view along line A-A of FIG. 2A; FIG. 2C shows detail A in FIG. 2B; FIG. 2D shows a side view of the base with the seal; FIG. 2E shows a top view of the base shown in FIG. 2D; and FIG. 2F shows a sectional view of the base along line A-A of FIG. 2E.

FIGS. 3A-3D show a filter device according to another aspect of the invention, comprising the aspect of the filter shown in FIG. 2A arranged in a housing. FIG. 3A shows a partial cut-away side view of the device, also showing the filter, and the filter housing, including a housing inlet and a housing outlet; FIG. 3B shows a top view of the device shown in FIG. 3A; FIG. 3C shows a cross-sectional view of the device along line AU-AU of FIG. 3B, also showing the fluid flow path through the device from the housing inlet to the housing outlet through the filter, and outside-in filtration flow through the filter, providing filtered fluid passing through the base outlet port of the filter and the housing outlet; and FIG. 3D shows a bottom view of the device shown in FIG. 3A.

Figure 4A:
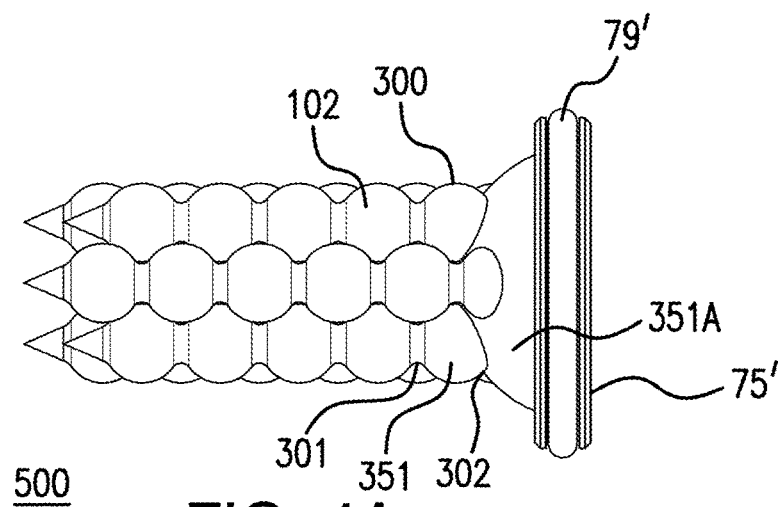
Figure 4B:
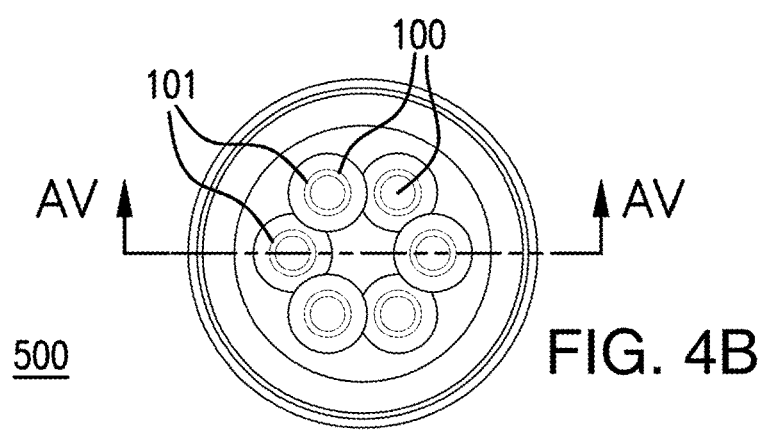
Figure 4C:
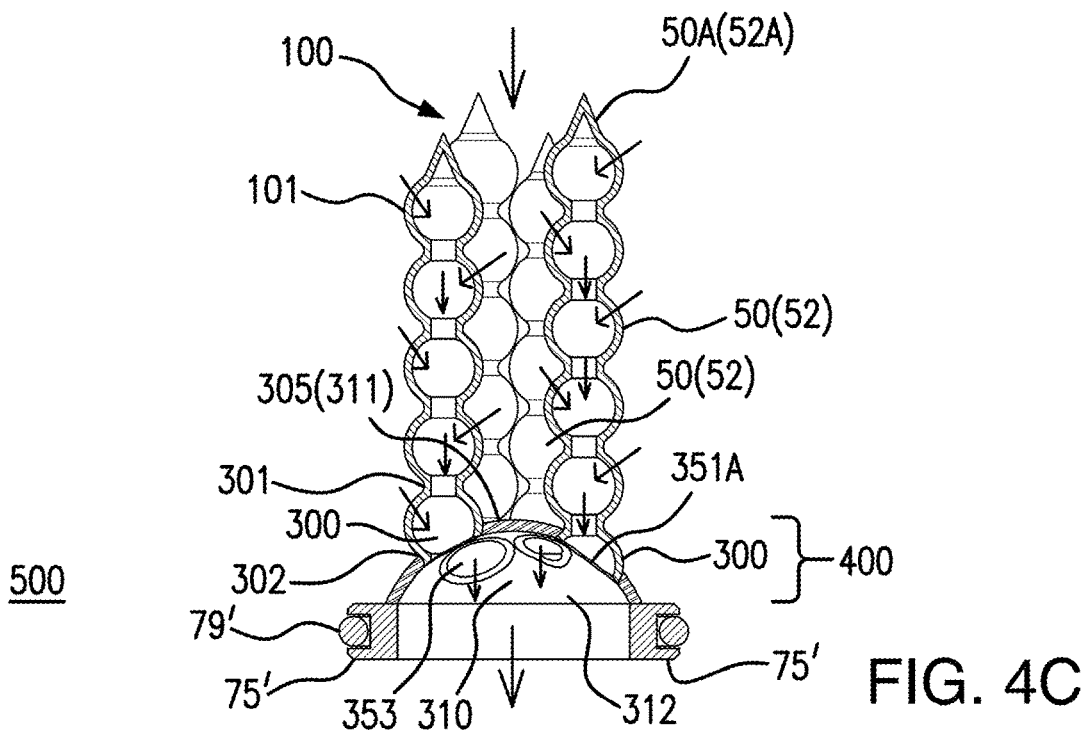
Figure 4D:
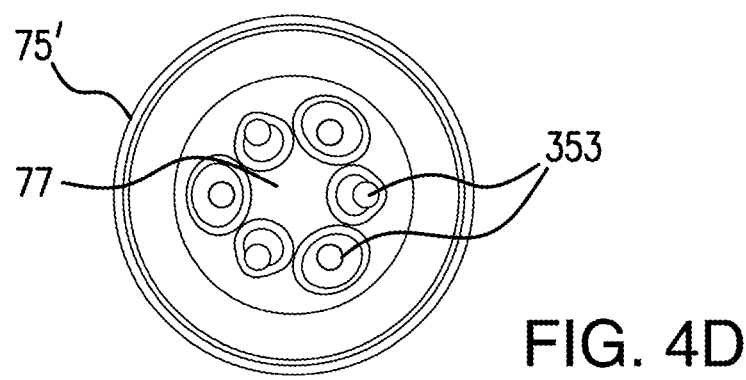
Figure 4E:
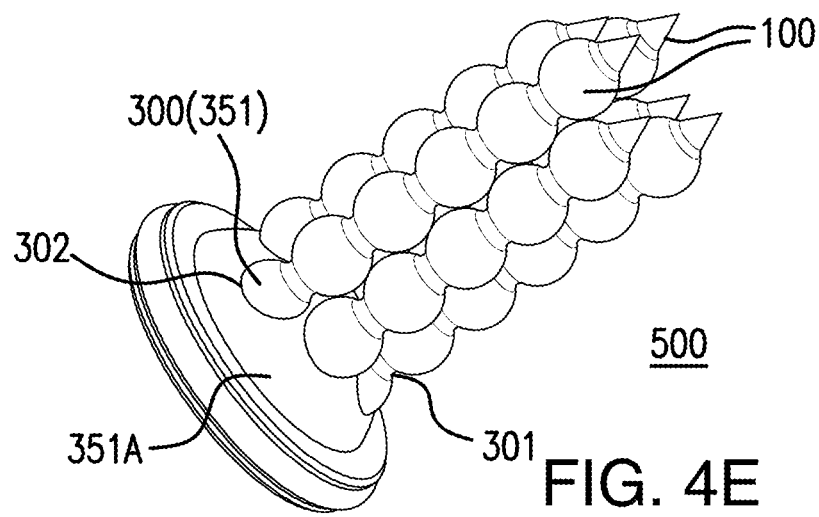
Figure 4F:
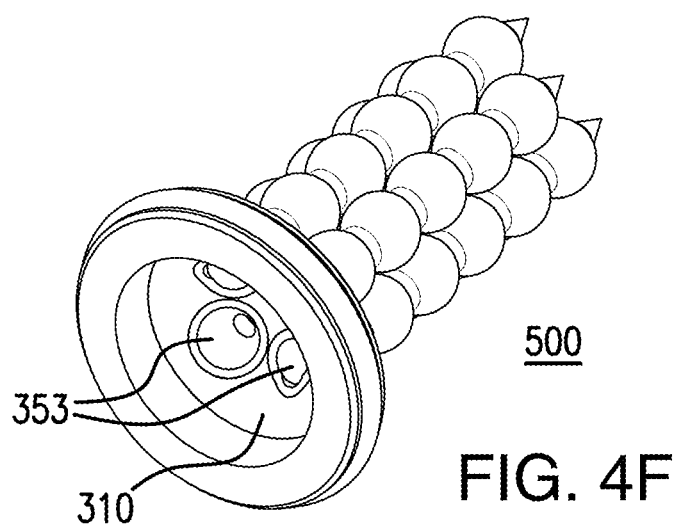

FIG. 4A illustrates a side view of a filter including a plurality of nested filter arms, each filter arm including a plurality of hollow rounded elements (each element illustrated as a spherical element, wherein the hollow element at the first end (the terminal element) has a pointed top), each filter arm having a first (upper) end and a second (lower) end; the filter also including a hollow transition element comprising a collector having a porous side wall, a central cavity, an upper closed end and a lower open end; and a plurality of hollow transition element arms, each transition element arm having a first transition arm end, a second transition arm end, and a side wall; wherein each first transition arm end is connected to, and in fluid communication with, a second end of a filter arm; and each second transition arm is connected to the side wall of the collector, and is in fluid communication with the central cavity of the collector via an aperture in the side wall of the collector; and, (c) a hollow base having a side wall and a base outlet port, wherein the base is connected to, and in fluid communication with, the lower open end of the collector; FIG. 4B is a top view of the filter shown in FIG. 4A; FIG. 4C is a sectional view along line AV-AV of FIG. 4B, also showing outside-in filtration flow through the filter, providing filtered fluid passing through the base of the filter; FIG. 4D is a bottom view of the filter shown in FIG. 4A; FIG. 4E is a top side perspective view of the filter; and FIG. 4F is a bottom side perspective view of the filter.

Figure 5A:
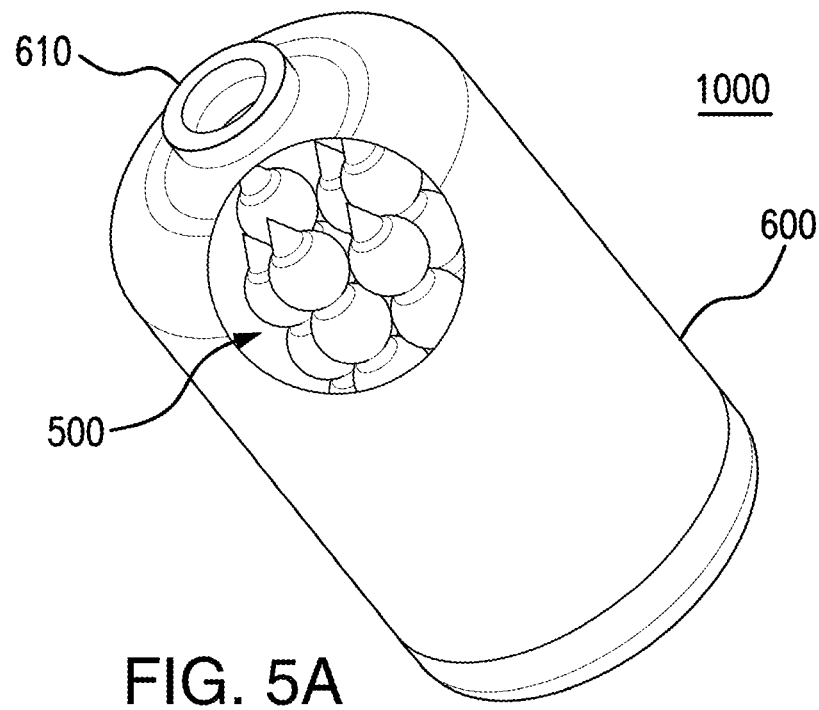
Figure 5B:
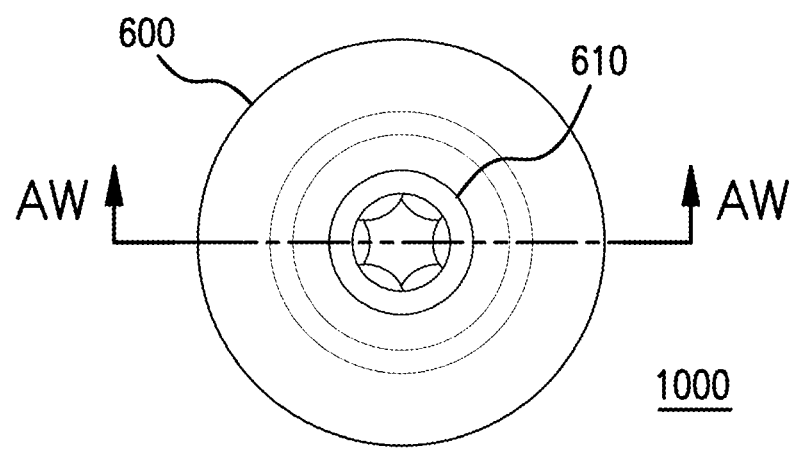
Figure 5C:
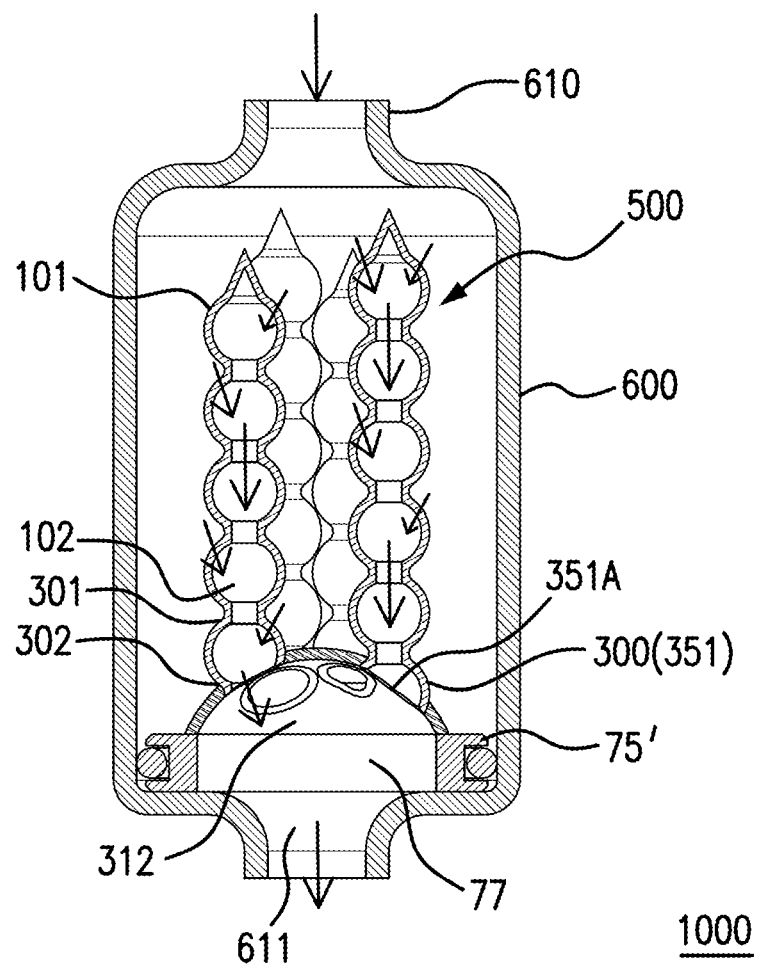
Figure 5D:
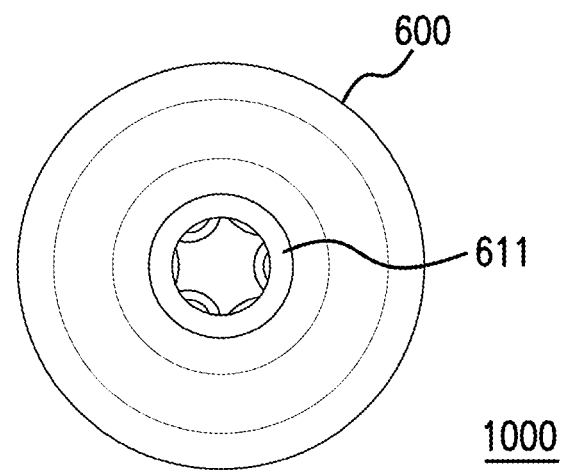

FIGS. 5A-5D show a filter device according to another aspect of the invention, comprising the aspect of the filter shown in FIG. 4A arranged in a housing. FIG. 5A shows a partial cut-away side view of the device, also showing the filter, and the filter housing, including an inlet and an outlet; FIG. 5B shows a top view of the device shown in FIG. 5A; FIG. 5C shows a cross-sectional view of the device along line AW-AW of FIG. 5B, also showing the fluid flow path through the device from the housing inlet to the housing outlet through the filter, and outside-in filtration flow through the filter, providing filtered fluid passing through the base outlet port of the filter and the housing outlet; and FIG. 5D shows a bottom view of the device shown in FIG. 5A.

Figure 6A:
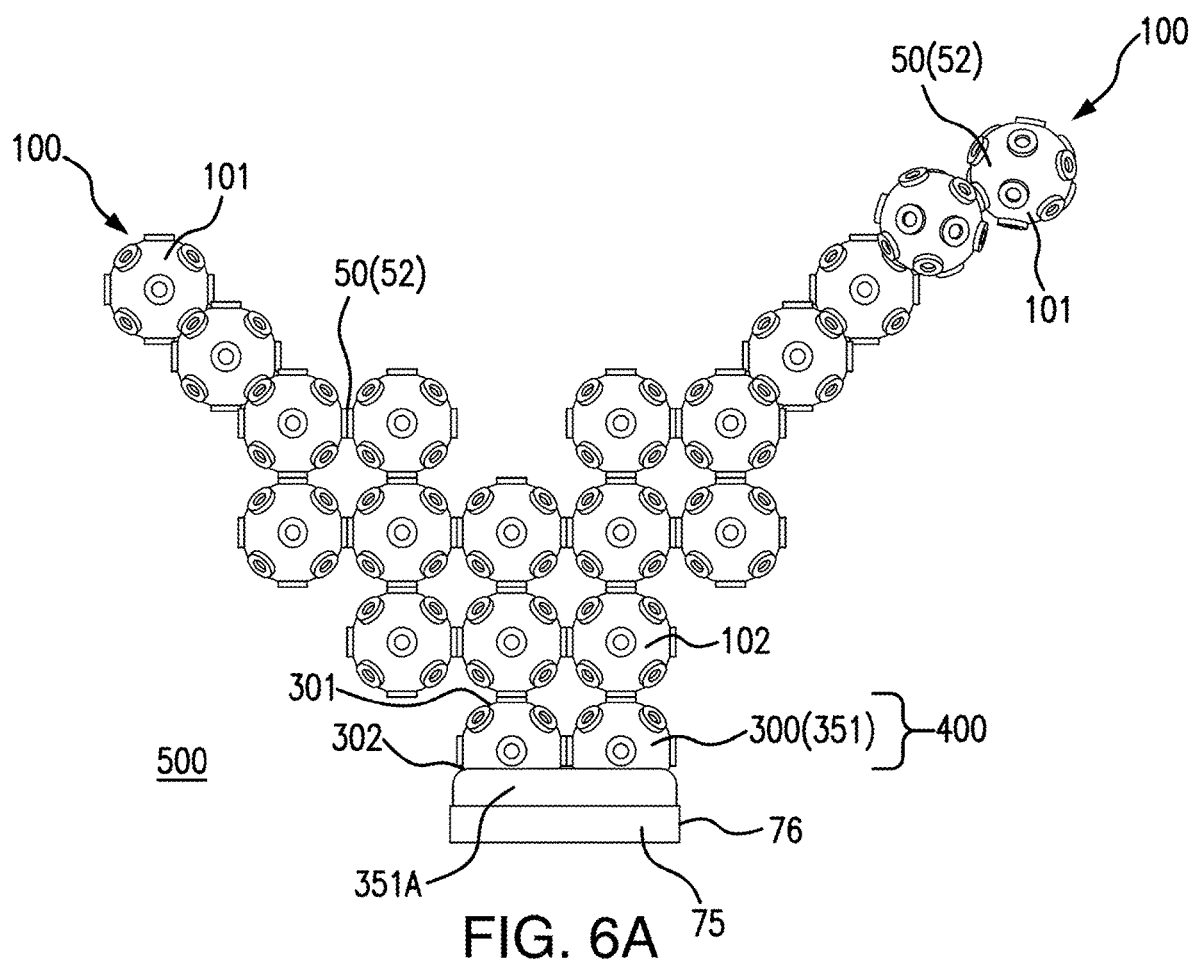
Figure 6B:
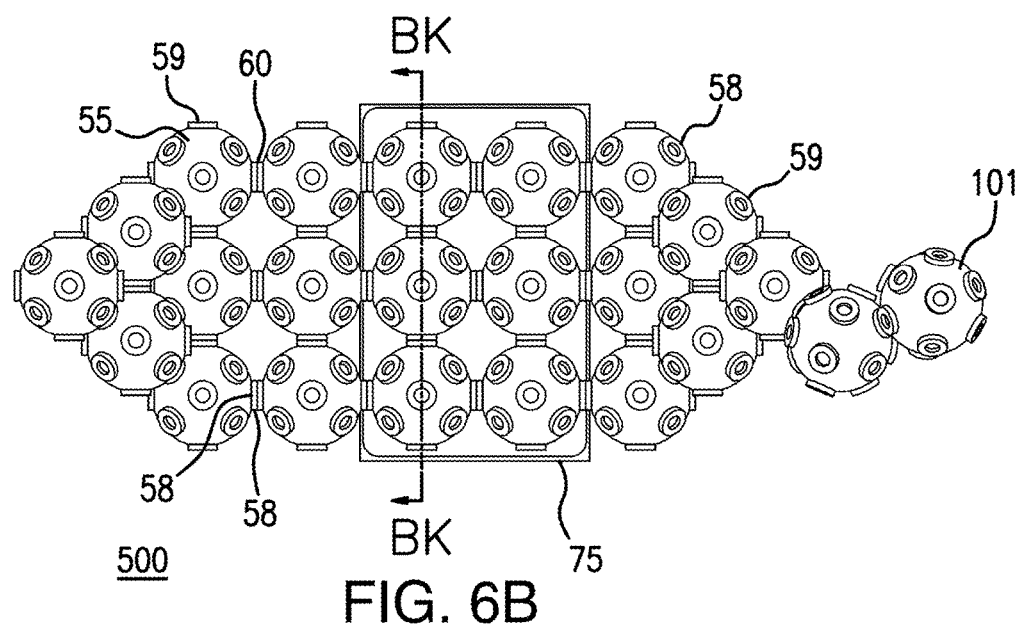
Figure 6C:
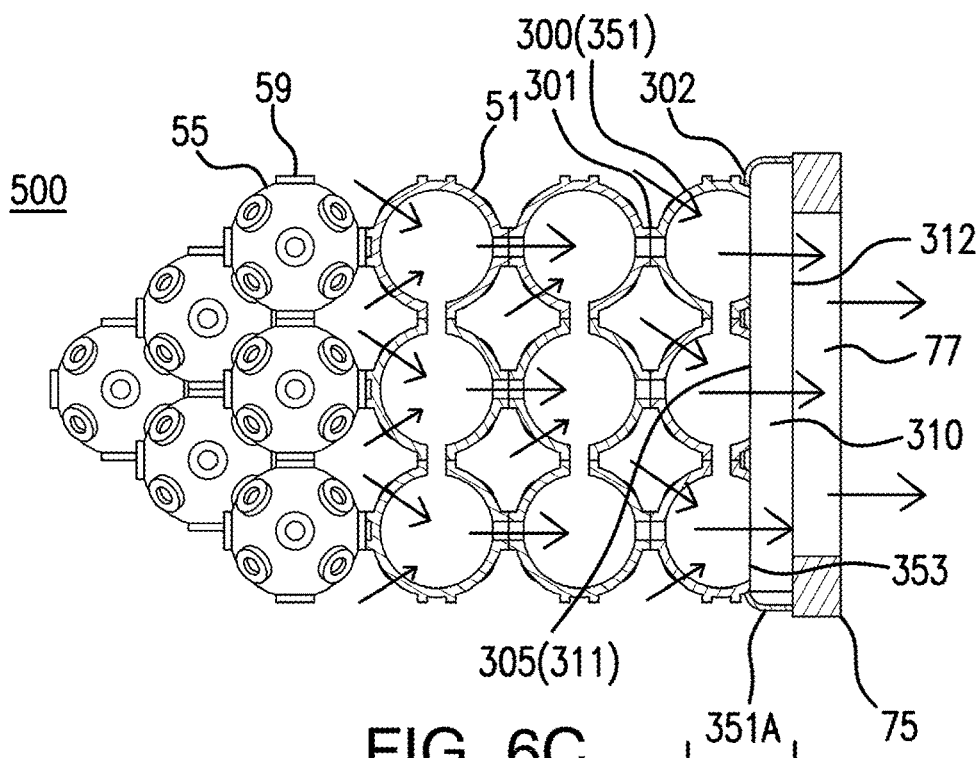
Figure 6D:
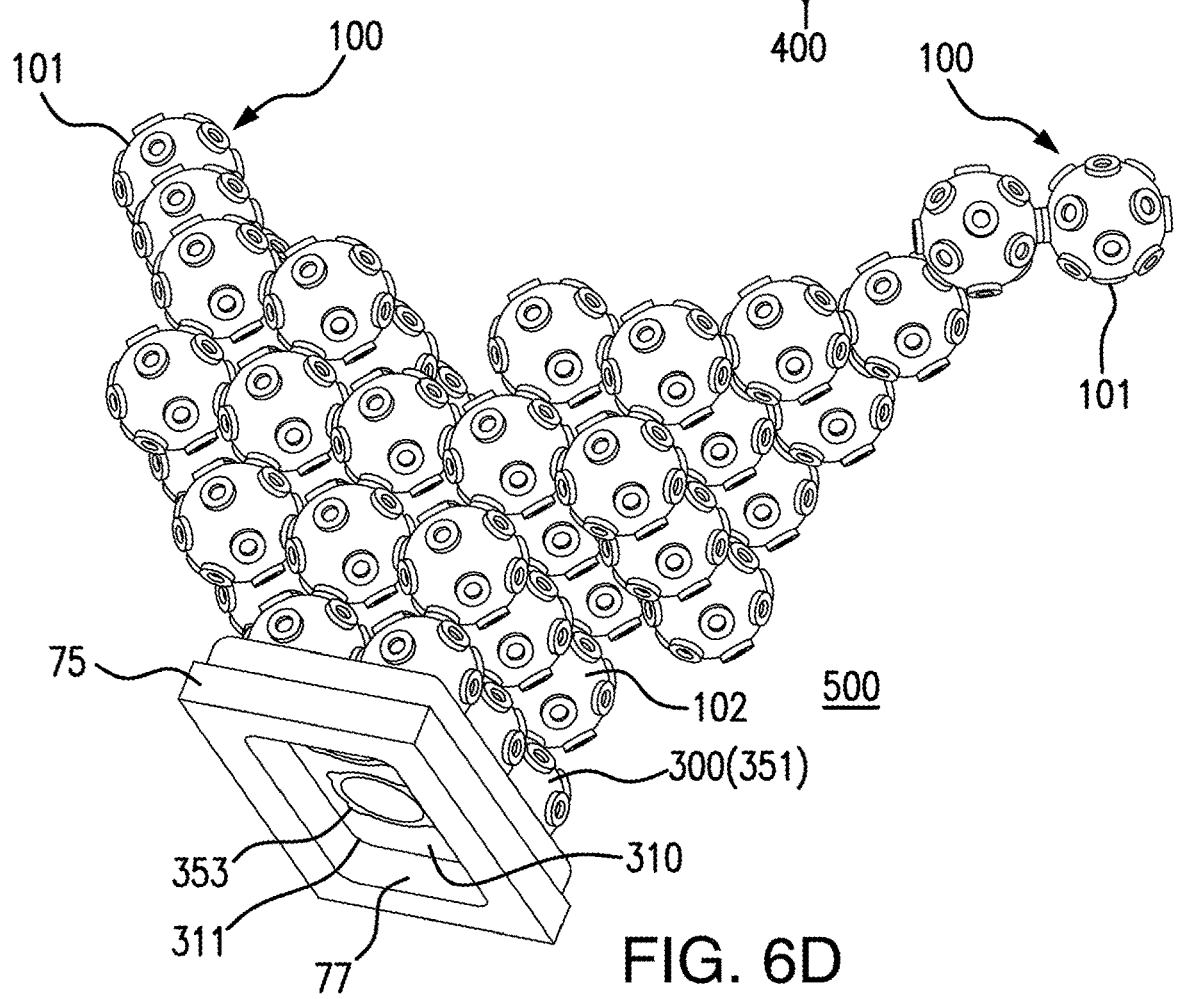
Figure 6E:
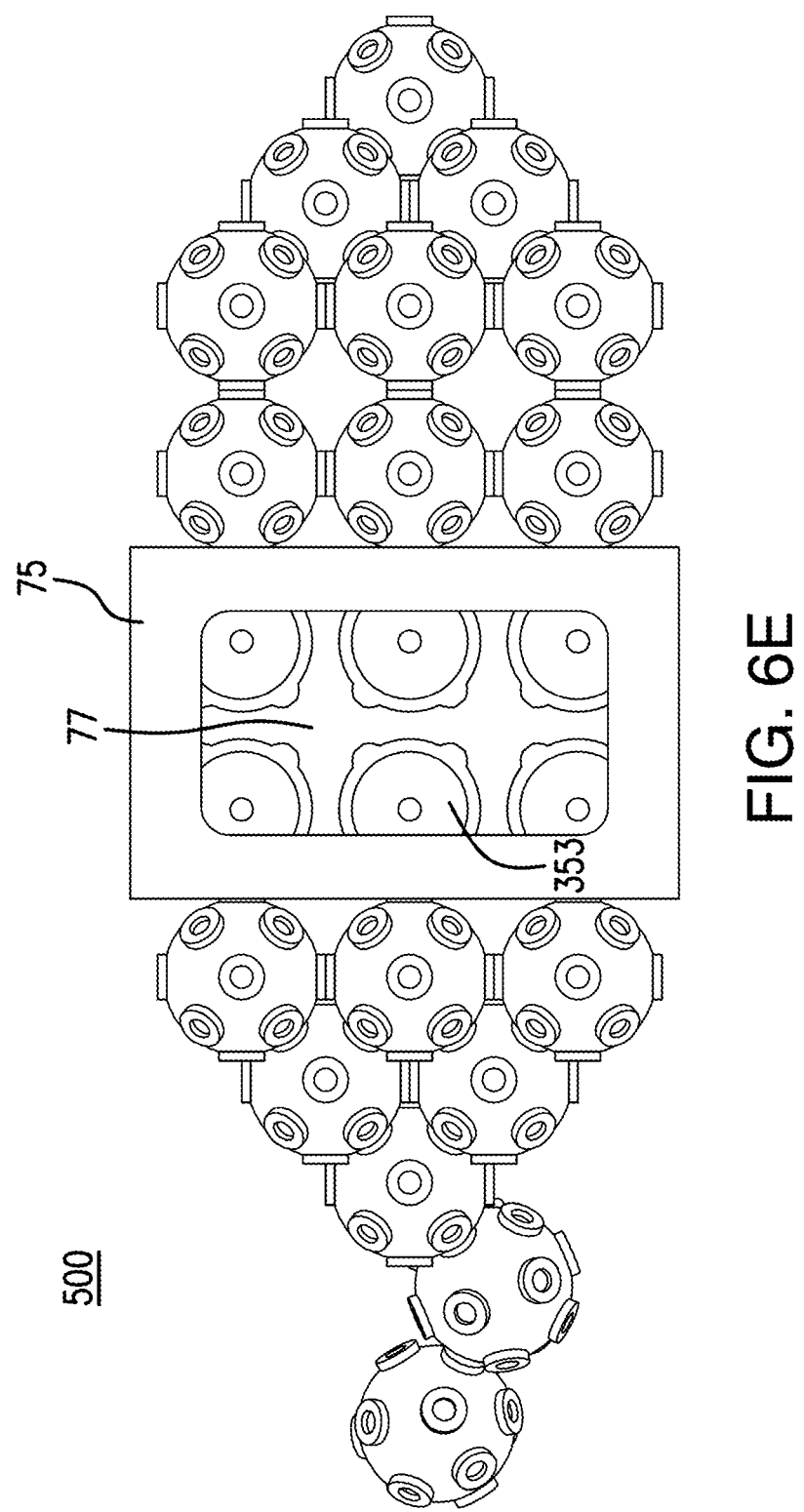

FIGS. 6A-6E show another aspect of a filter with filter arms having hollow rounded elements wherein the hollow rounded elements at the first ends are rounded at the top, and adjacent hollow elements are connected via coordination points to provide integral necks (the elements including collars on their outer surfaces connected to each other), each filter arm having a first (upper) end and a second (lower) end; the filter also including a hollow transition element comprising a collector having a side wall, a central cavity, an upper closed end and a lower open end; and a plurality of hollow transition element arms, each transition element arm having a first transition arm end, a second transition arm end, and a side wall; wherein each first transition arm end is connected to, and in fluid communication with, a second end of a filter arm; and each second transition arm is connected to the side wall of the collector, and is in fluid communication with the central cavity of the collector via an aperture in the side wall of the collector; and, (c) a hollow base having a side wall and a base outlet port, wherein the hollow base is connected to, and in fluid communication with, the lower open end of the collector. FIG. 6A shows a side view; FIG. 6B shows a top view; FIG. 6C shows a cross-sectional view along line BK-BK of FIG. 6B, also showing outside-in filtration flow through the filter, providing filtered fluid passing through the base outlet port of the filter and the housing outlet; FIG. 6D shows a bottom side perspective view; and FIG. 6E shows a bottom view.

Figure 7D:
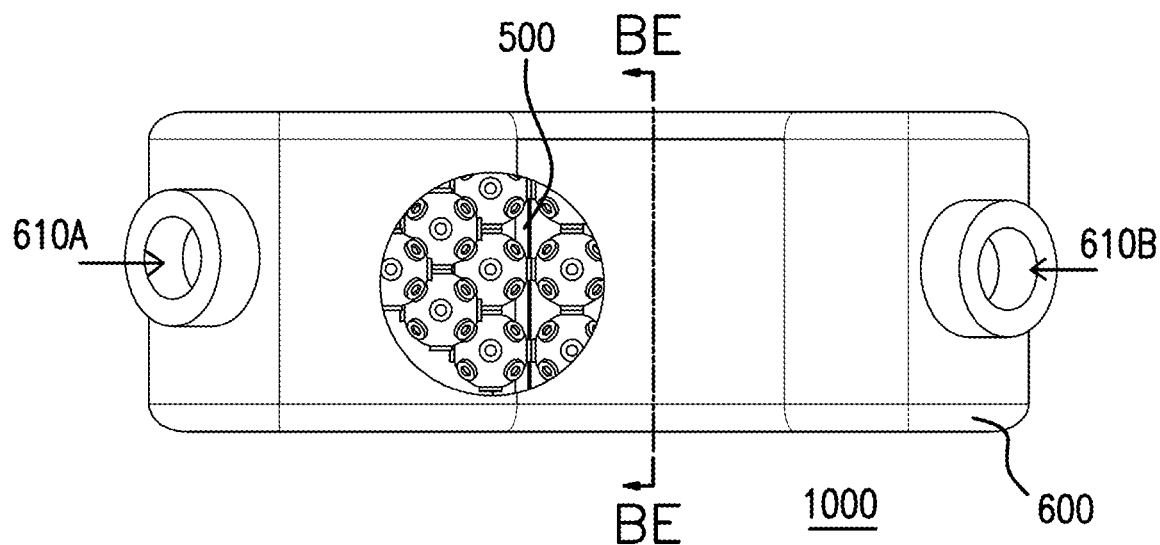
Figure 7E:
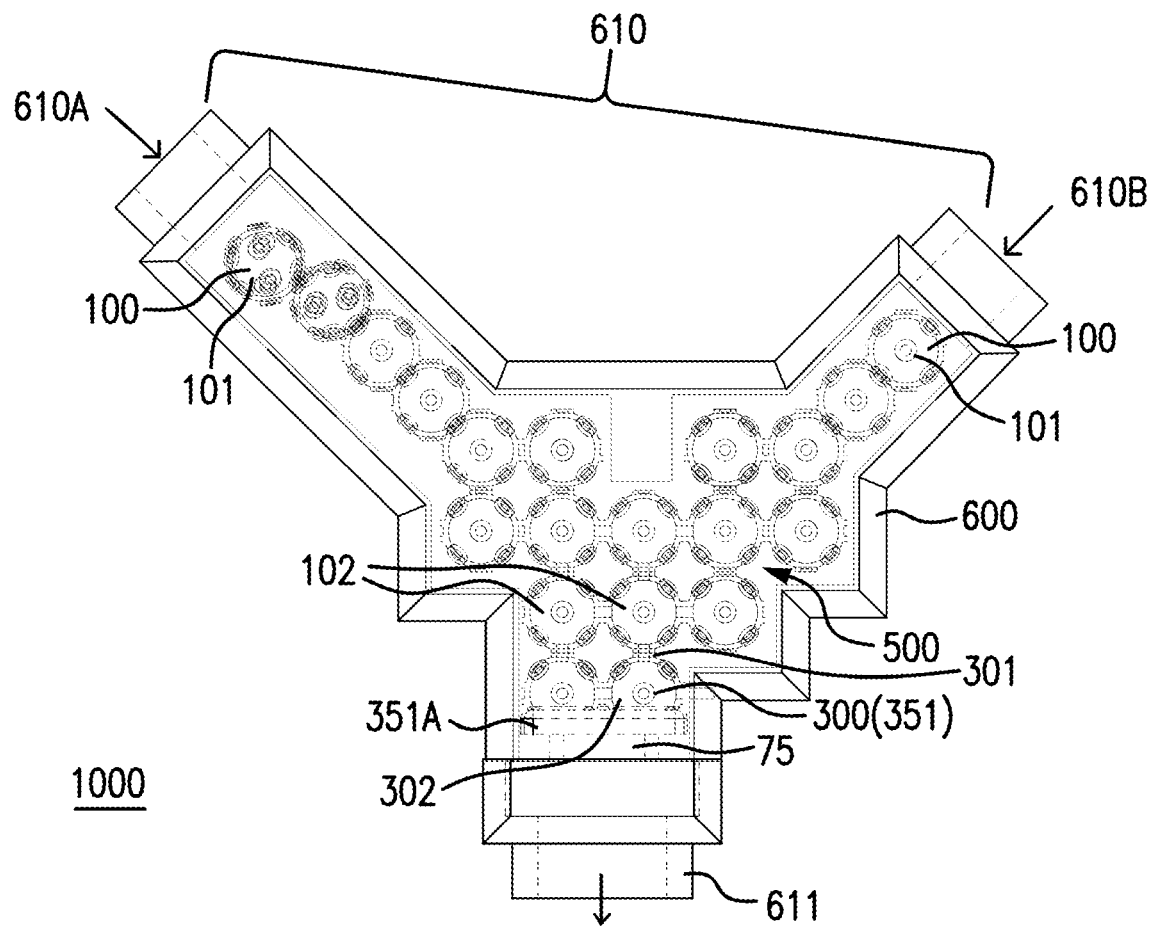
Figure 7F:
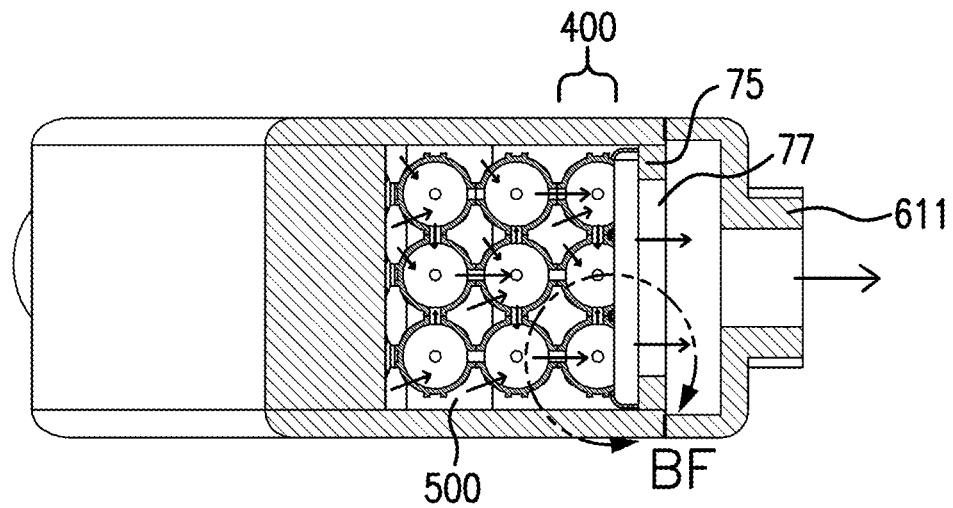
Figure 7G:
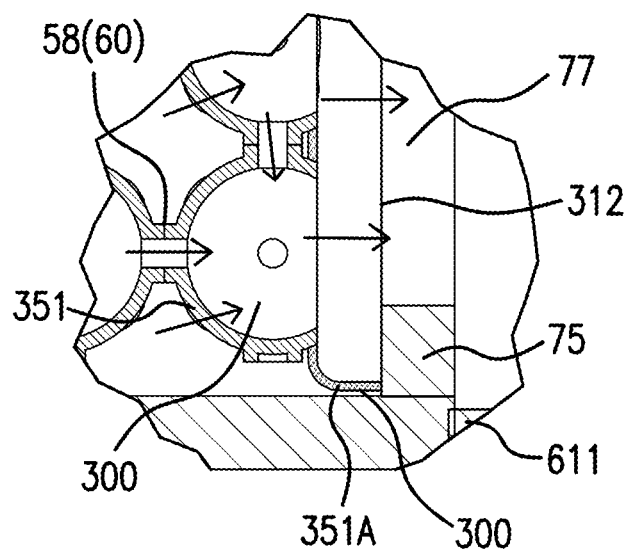

FIGS. 7A-7G show a filter device according to another aspect of the invention, comprising the aspect of the filter shown in FIG. 6A arranged in a housing. FIG. 7A shows a side view of the housing, including two housing inlets and a housing outlet; FIG. 7B shows a perspective top view of the housing shown in FIG. 7A, also showing the first end of a filter arm; FIG. 7C shows a perspective bottom view of the housing shown in FIG. 7A; FIG. 7D shows a top view of the housing with a partial cut-away showing the filter; FIG. 7E shows a sectional view of the filter device along line BE-BE of FIG. 7D, also showing the filter shown in FIG. 6A arranged in the housing, the housing defining fluid flow paths between the inlets and the outlet, with the filter arranged in the housing across the fluid flow paths, wherein outside-in filtration provides filtered fluid passing through the filter hollow base outlet ports and the housing outlet; FIG. 7F shows a partial cut-away view of the bottom of the filter device, also showing a partial cross-sectional view of the bottom of the filter, and outside-in filtration through the side walls of the hollow elements providing filtered fluid passing through the base outlet port of the filter and the housing outlet; and FIG. 7G shows an enlarged view of detail BF shown in FIG. 7F.

Figure 8A:
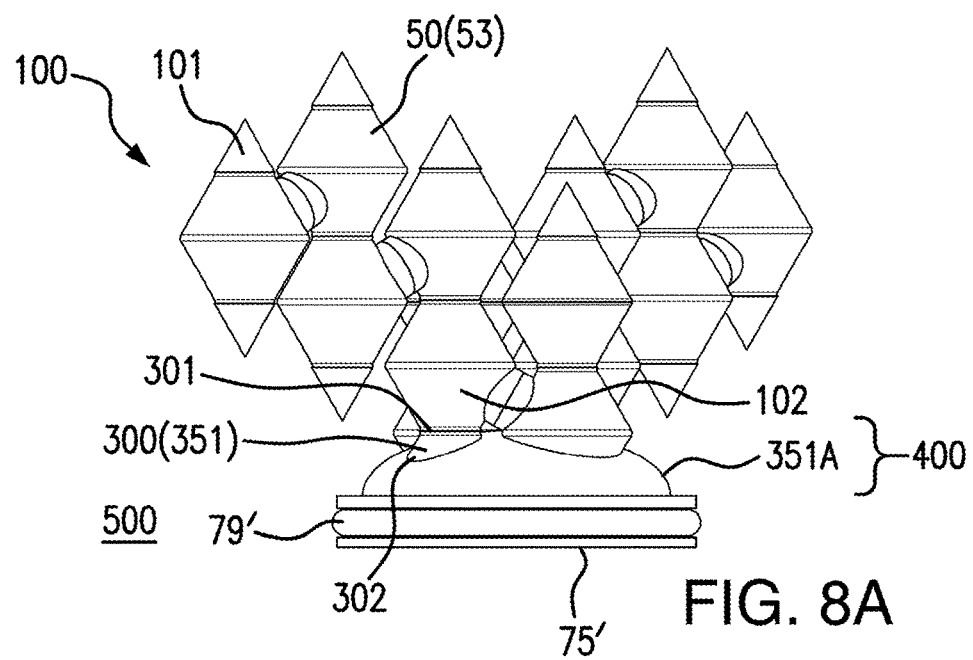
Figure 8B:
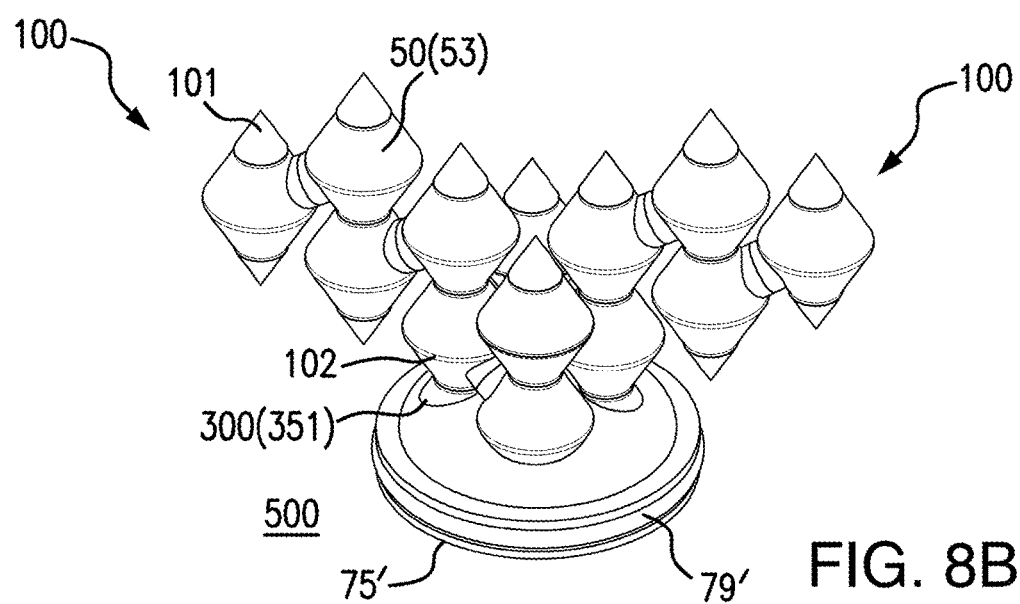
Figure 8C:
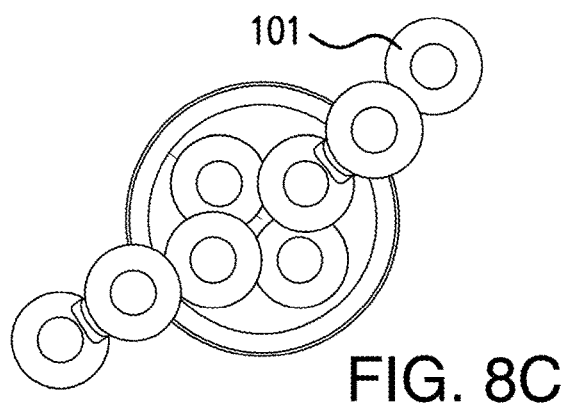
Figure 8D:
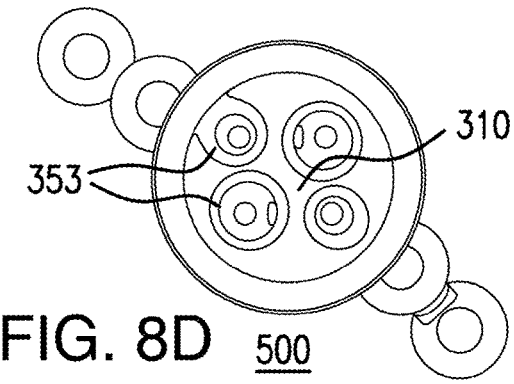
Figure 8E:
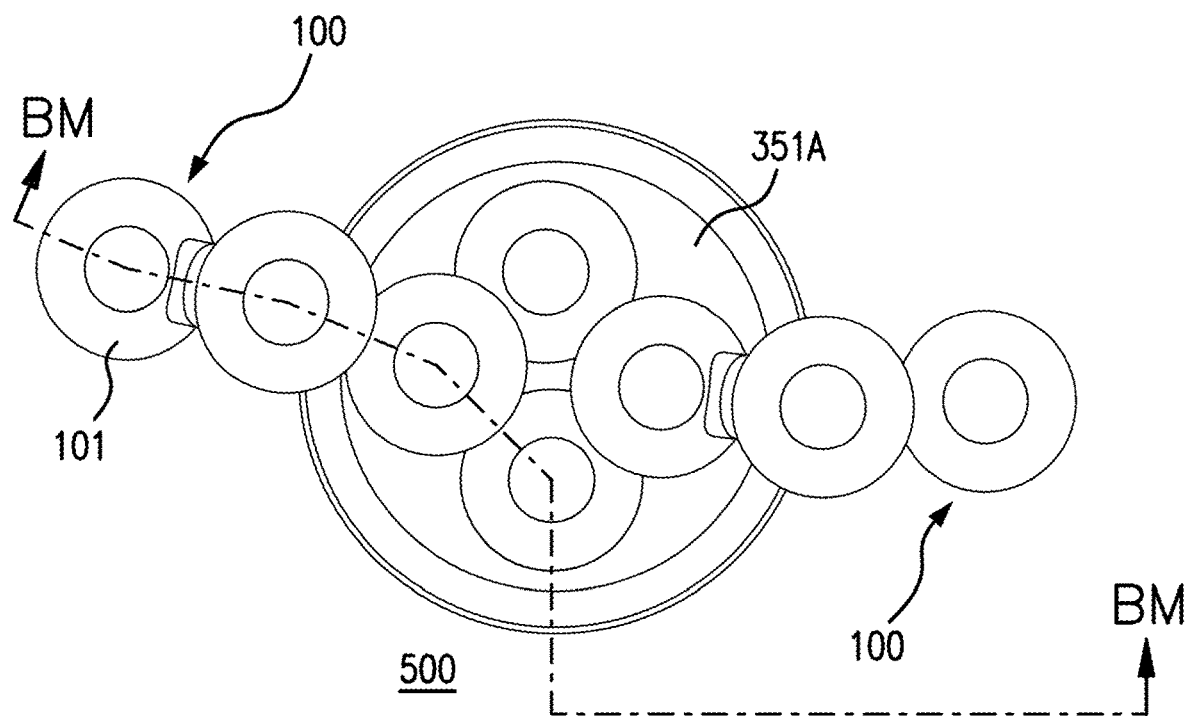
Figure 8F:
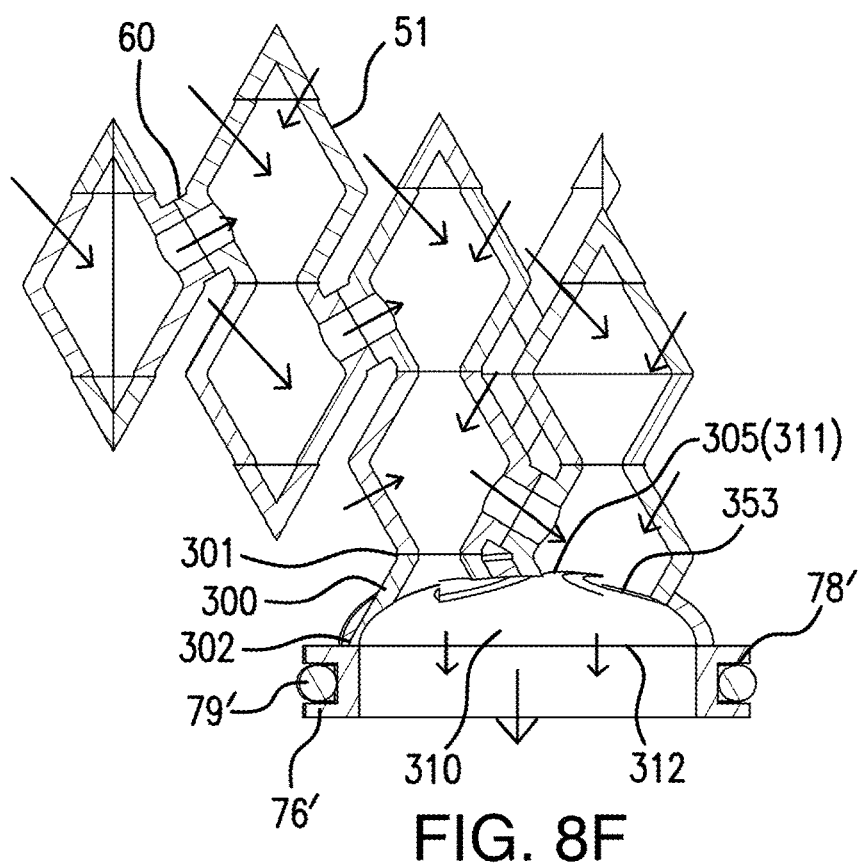

FIGS. 8A-8F show another aspect of a filter with filter arms having hollow non-rounded elements, wherein portions of a filter arm can have linearly aligned hollow non-rounded elements and non-linearly aligned hollow non-rounded elements, wherein each element is connected to, and in fluid communication with, an adjacent element via a coordination point, the connected coordination points providing an integral neck, wherein the filters include hollow transition elements and wherein the base includes a groove in the side wall and a resilient seal in the groove. FIG. 8A shows a side view; FIG. 8B shows a side perspective view; FIG. 8C shows a top view; FIG. 8D shows a bottom view; FIG. 8F shows a side cross-sectional view along line BM-BM of FIG. 8E, also showing outside-in filtration through the side walls of the hollow elements providing filtered fluid passing through the base outlet port of the filter.

Figure 9A:
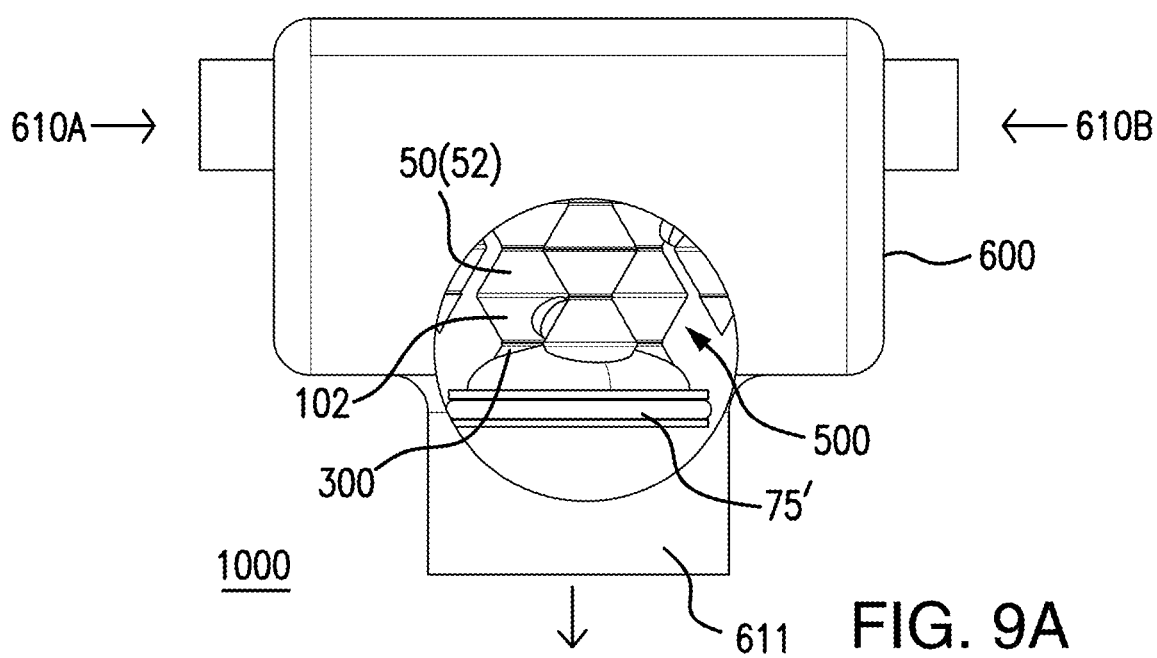
Figure 9B:
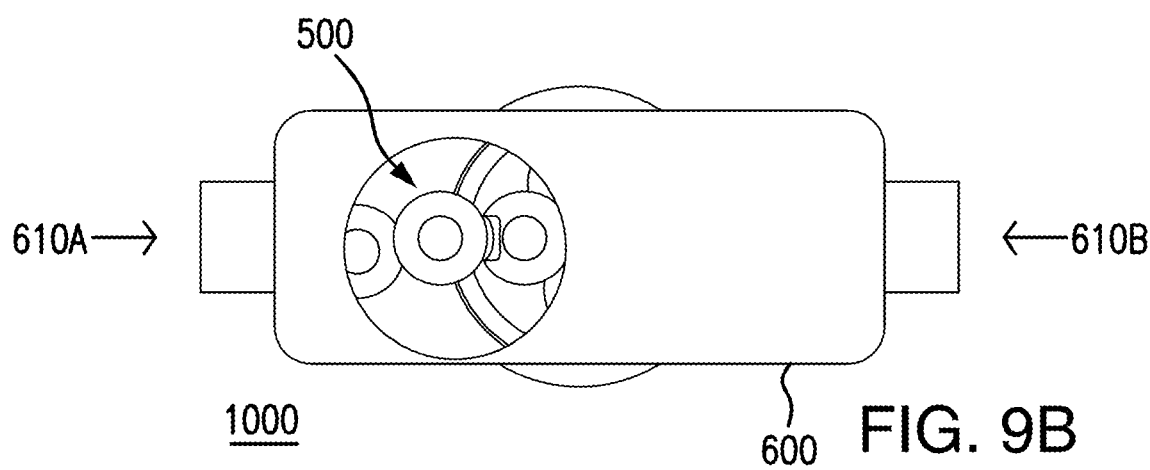
Figure 9C:
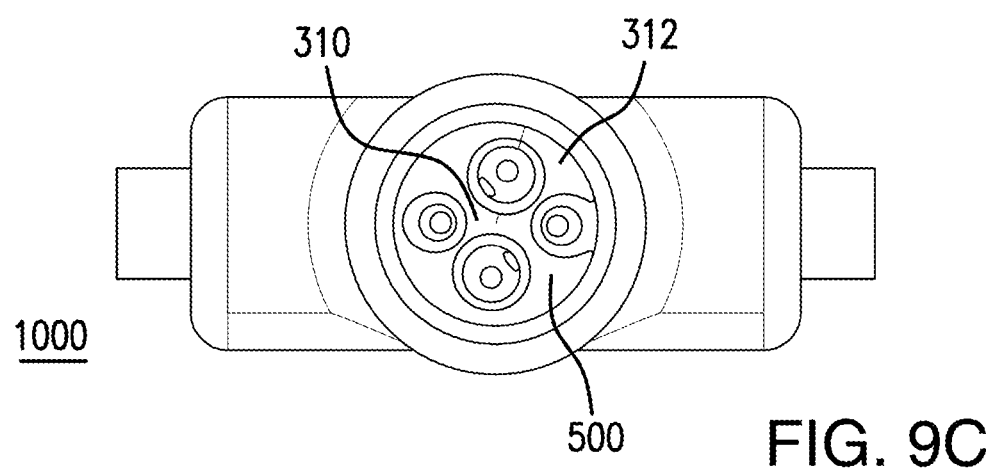
Figure 9D:
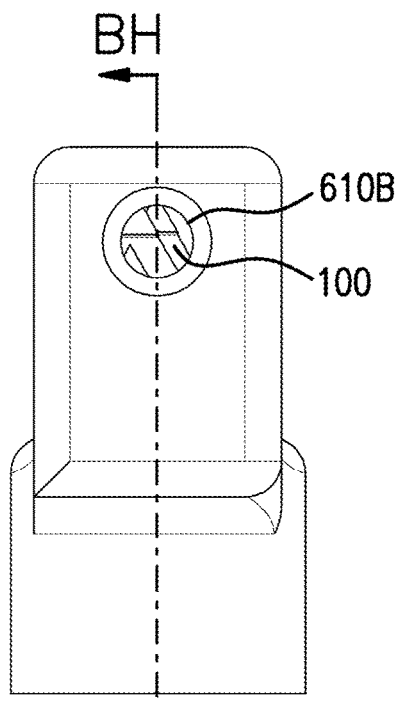
Figure 9F:
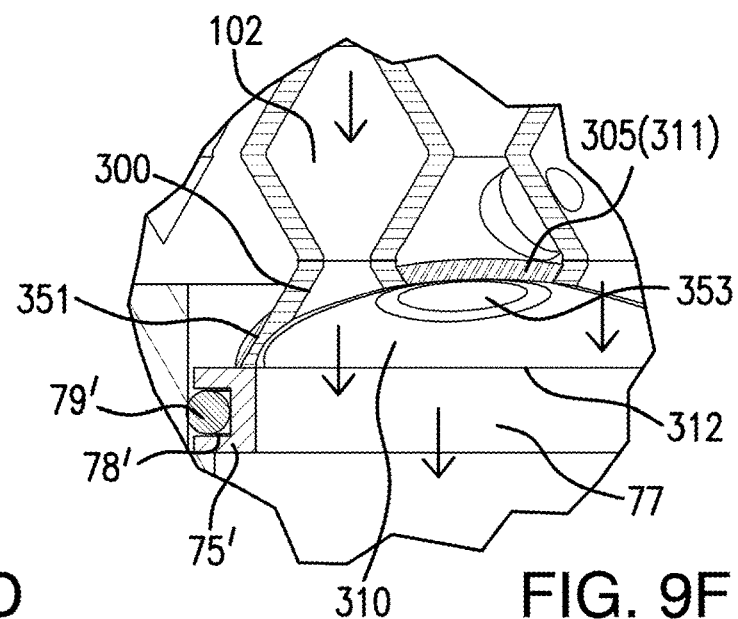
Figure 9E:
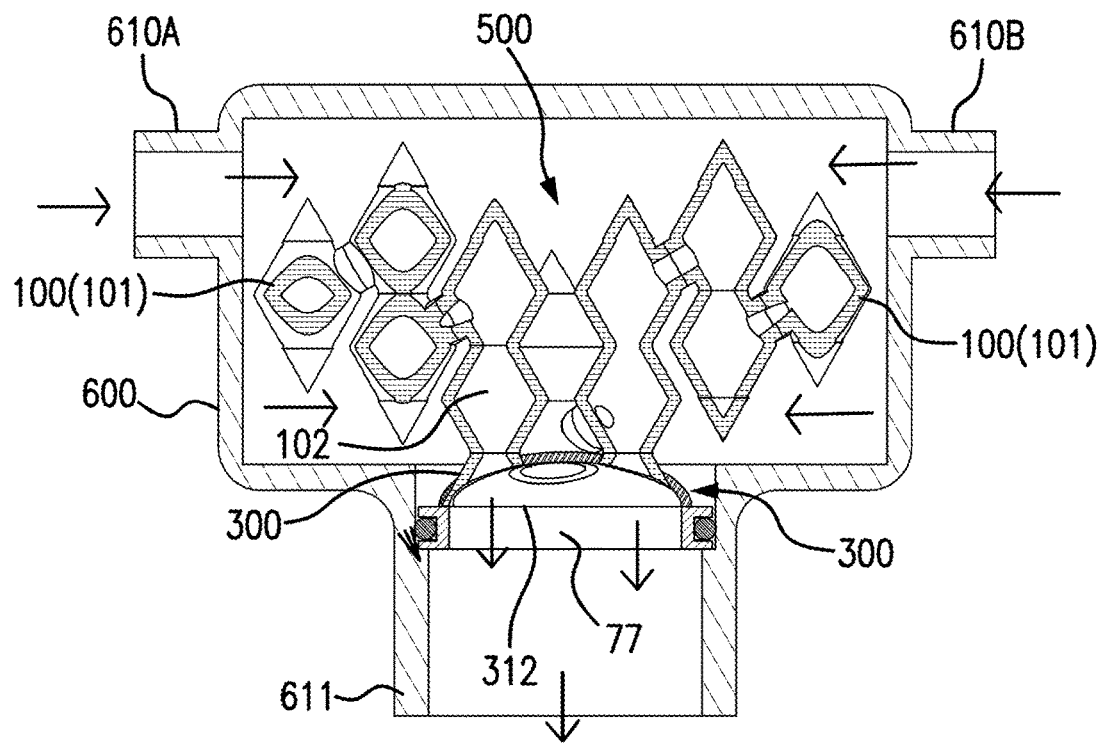

FIGS. 9A-9F show a filter device according to another aspect of the invention, comprising the aspect of the filter shown in FIG. 8A arranged in a housing. FIG. 9A shows a side partial cut-away view of the housing, including two housing inlets and a housing outlet, wherein the filter is arranged in the housing across the fluid flow paths from each housing inlet to the housing outlet; FIG. 9B shows a top partially cut-away view of the housing shown in FIG. 9A; FIG. 9C shows a bottom view of the device shown in FIG. 9A; FIG. 9D shows an end view of one inlet side of the device; FIG. 9E shows a sectional view of the filter device along line BH-BH of FIG. 9D, also showing the filter arranged in the housing across the fluid flow paths; and FIG. 9F shows a sectional view of detail BJ in the filter device of FIG. 9E.

DETAILED DESCRIPTION OF THE INVENTION

An aspect of the invention provides a filter comprising (a) at least one filter arm comprising a plurality of hollow elements in fluid communication with each other, the hollow elements having porous walls, the at least one filter arm having a first end and a second end; (b) a hollow transition element comprising a collector having a porous side wall, a central cavity, an upper closed end and a lower open end; and at least one hollow transition element arm having a first transition arm end, a second transition arm end, and a porous side wall; wherein the first transition arm end is connected to, and in fluid communication with, the second end of the at least one filter arm; and the second transition arm is connected to the side wall of the collector, and is in fluid communication with the central cavity of the collector via at least one aperture in the side wall of the collector; and, (c) a hollow base having a side wall, and a base outlet port, wherein the hollow base is connected to, and in fluid communication with, the collector of the hollow transition element.

In a preferred aspect, the filter comprises a plurality of filter arms, each filter arm having a first end and a second end; and a plurality of hollow transition element arms, each hollow transition element arm having a first transition arm end and a second transition arm end, each second end of a filter arm being connected to, and in fluid communication with, a first transition arm end; each second transition arm end being connected to the side wall of the collector and in fluid communication with the central cavity of the collector via an aperture in the side wall of the collector.

The hollow base has at least one base outlet port.

The base can have any suitable shape, e.g., rectangular, square, triangular, round, or oval.

The base has one or more side walls, and the side wall(s) can be porous or, in a preferred aspect, non-porous.

In some aspects, the side wall(s) of the base include a groove, and a resilient seal such as an o-ring in the groove.

If desired, the use of a seal can be desirable when the filter is inserted in a separate housing. Alternatively, if for example, the filter is produced as part of the housing or is welded to the housing, the seal can be eliminated, if desired.

Aspects of the invention include filter devices including aspects of the filters, and methods of filtration using the filters and filter devices.

In accordance with aspects of the invention, a hollow element can have a rounded shape or a non-rounded shape, and a filter arm can include hollow elements each having the same shape or having different shapes. A filter arm can have a combination of different hollow element shapes, e.g., rounded shapes (including spherical and oval) and non-rounded shapes (including hexagonal, pyramidal, conal, diamond). For example, an arm can include a rounded shape and a non-rounded shape, and/or a plurality of different rounded shapes and/or a plurality of different non-rounded shapes.

In some aspects of the filter, an individual filter arm can comprise at least two hollow elements each having different shapes and/or the filter can include a plurality of arms wherein at least two arms have different configurations from each other, e.g., one arm can have hollow elements with rounded shapes and another arm can have hollow elements with non-rounded shapes, or the respective arms can have different combinations of shapes.

Alternatively, or additionally, different hollow elements can have different diameters and/or different wall thicknesses.

Advantageously, filters can be produced with high packing densities. For example, filters can be produced with packing densities of about 20% greater than achieved with hollow fiber filters. Additionally, filters can be designed for direct flow and cross flow configurations. If desired, filters can be produced without support elements such as meshes or screens.

The use of a transition element can be advantageous in providing fluid communication with the filter arms wherein the arms can be connected with some variation in the positioning of the arms during formation of the filter. Moreover, the collector is self-supportive making it easier to produce (e.g., during additive manufacturing), and axially, it is structurally supportive to resist structure collapse, e.g., supporting the axial force generated by the filter arms under differential pressure during filtration.

Each of the components of the invention will now be described in more detail below, wherein like components have like reference numbers.

FIGS. 1A-1F illustrate various views of an aspect of a filter 500 including a plurality of filter arms 100 (shown arranged vertically in an array, the filter arms showing a nested geometry wherein adjacent arms are offset by each other by one half the spacing of the hollow elements 50 in each of the horizontal planes), a hollow transition element 400, and a hollow base 75.

Each illustrated aspect of the filter arm 100 comprises a plurality of hollow non-rounded elements 50 (illustrated as having the shape of opposing cones 53) in fluid communication with each other (wherein adjacent elements are in fluid communication with each other via coordination points 58 providing hollow integral necks 60 connected to the porous side walls 51 (in some aspects, e.g., as shown in FIG. 6B, the coordination points include collars 59 on the outer surfaces 55 of the adjacent rounded and non-rounded hollow elements) of the adjacent elements); the porous side walls 51 allowing outside-in filtration (as shown in FIG. 1D), each filter arm having a first end 101 and a second end 102. In the aspect shown in FIG. 1A, the hollow element at the first end (the terminal element 50A, 53A) has a different shape (a pointed top) than the other hollow elements As shown in more detail in FIGS. 1C-1G, the illustrated aspect of the hollow transition element 400 comprises a collector 305 having a porous side wall 351A, a central cavity 310, an upper closed end 311 and a lower open end 312; and a plurality of hollow transition element arms 300, each transition element arm 300 having a first transition arm end 301, a second transition arm end 302, and a porous side wall 351 (allowing outside-in filtration (as shown in FIG. 1D)); wherein each first transition arm end 301 is connected to, and in fluid communication with, a second end 102 of a filter arm 100; and each second transition arm 302 is connected to the side wall 351A of the collector 305, and is in fluid communication with the central cavity 310 of the collector via an aperture 353 in the side wall of the collector; and, (c) a hollow base 75 having a side wall 76 and a base outlet port 77, wherein the base 75 is connected to, and in fluid communication with, the lower open end 312 of the collector, allowing filtered fluid to pass from the central cavity through the base outlet port.

FIG. 1E shows a top view of the hollow transition element 400 of the filter shown in FIG. 1A, also showing, due to the nested geometry of the filter arms in the filter, alternating connection points have different diameters at any one cross-sectional plane; the side view of the transition element in FIG. 1F shows the collector centrally located between transition element arms, and the sectional view of FIG. 1G shows the second transition arms connected to the side wall of the collector and in fluid communication with the central cavity of the collector via apertures, allowing filtered fluid to pass from the lower open end 312 of the collector through the base outlet port 77.

FIG. 1D (partial view with two arms in an axial arrangement) illustrates a sectional view of the filter 500, also showing an outside-in filtration flow path through the porous walls 51 and flow through the transition elements arms 300 and the base outlet port 77.

Filters can have any number of filter arms and hollow elements. Typically, the filter has at least about 3 arms, each arm having at least about 2 hollow elements. Preferably, the filter has at least about 7 arms, each arm having at least about 3 hollow elements.

If desired, filter arms can be connected vertically and/or diagonally.

Hollow elements can have any number coordination points. Typically, a hollow element has at least 2 coordination points (e.g., to receive fluid from one hollow element and to pass fluid to another hollow element), more typically, at least 3 coordination points, and preferably, at least 4 coordination points.

FIG. 2A-2B illustrates another aspect of a filter 500 similar to that shown in FIGS. 1A-1F, with a different base. In contrast with base 75 as shown in FIGS. 1A-1F, FIGS. 2A-2F show a base 75' having a seal 79' (e.g., a resilient element such as an o-ring) arranged in a groove 78' in the side wall of the base 75', the base having side walls 76' and base outlet ports 77'.

FIGS. 3A-3D show a filter device 1000 according to another aspect of the invention, comprising the aspect of the filter 500 shown in FIG. 2A arranged in a housing 600 having a housing inlet 610 and a housing outlet 611, defining a fluid flow path between the inlet 610 and the outlet 611 with the filter 500 across the fluid flow path. In particular, the cross-sectional view in FIG. 3C shows the fluid flow path through the device and outside-in filtration flow through the filter, providing filtered fluid passing through the base 75' and base outlet port 77 of the filter and the housing outlet 611.

FIG. 4A illustrates a side view of another filter 500 according to an aspect of the invention, the filter 500 including a plurality of nested filter arms 100, each filter arm including a plurality of hollow rounded elements 50 (each element illustrated as a spherical element 52, wherein the hollow element at the first end 101 (the terminal element 50A, 52A) has a pointed top), each filter arm 100 having a first (upper) end 101 and a second (lower) end 102; the filter also including a hollow transition element 400 comprising a collector 305 having a porous side wall 351A, a central cavity 310, an upper closed end 311 and a lower open end 312; and a plurality of hollow transition element arms 300, each transition element arm having a first transition arm end 301, a second transition arm end 302, and a side wall 351; wherein each first transition arm end is connected to, and in fluid communication with, a second end 102 of a filter arm 100; and each second transition arm 302 is connected to the side wall 351A of the collector, and is in fluid communication with the central cavity 310 of the collector via an aperture 353 in the side wall of the collector; and, (c) a hollow base 75' having a side wall 76' and a base outlet port 77, wherein the base is connected to, and in fluid communication with, the lower open end 312 of the collector. The sectional view in FIG. 4C also shows outside-in filtration flow through the filter (e.g., including flow through the porous side walls 51 of the hollow rounded elements), providing filtered fluid passing through the base outlet port 77 of the filter.

FIGS. 5A-5D show a filter device 1000 according to another aspect of the invention, comprising the aspect of the filter 500 shown in FIG. 4A arranged in a housing 600 having a housing inlet 610 and a housing outlet 611, defining a fluid flow path between the housing inlet and the housing outlet with the filter 500 arranged in the housing across the fluid flow path. The sectional view in FIG. 5C also shows outside-in filtration flow through the filter (e.g., including flow through the porous side walls 51 of the hollow rounded elements), providing filtered fluid passing through the base outlet port 77 of the filter and the housing outlet 611.

FIGS. 6A-6E show another aspect of a filter 500 according to an aspect of the invention, with filter arms 100 having hollow rounded elements wherein the hollow rounded elements 50 (52) at the first ends 101 are rounded at the top, and adjacent hollow elements are connected via coordination points 58 comprising collars 59 on the outer surfaces 55 of each hollow element (forming hollow integral necks 60), each filter arm having a first (upper) end 101 and a second (lower) end 102; the filter also including a hollow transition element comprising a collector having a porous side wall, a central cavity, an upper closed end and a lower open end; and a plurality of hollow transition element arms, each transition element arm having a first transition arm end, a second transition arm end, and a side wall; wherein each first transition arm end is connected to, and in fluid communication with, a second end of a filter arm; and each second transition arm is connected to the side wall of the collector, and is in fluid communication with the central cavity of the collector via an aperture in the side wall of the collector; and, (c) a hollow base having a side wall and a base outlet port, wherein the hollow base is connected to, and in fluid communication with, the lower open end of the collector. The sectional view in FIG. 6C also shows outside-in filtration flow through the filter (e.g., including flow through the porous side walls 51 of the hollow rounded elements), providing filtered fluid passing through the base outlet port 77 of the filter.

FIGS. 7A-7G show a filter device 1000 according to another aspect of the invention, comprising the aspect of the filter 500 shown in FIG. 6A arranged in a housing 600 having housing inlets 610 (illustrated as inlet 610A and 610B) and a housing outlet 611 defining fluid flow paths from each housing inlet to the common housing outlet 611 with the filter 500 arranged in the housing across the two fluid flow paths (shown in more detail in the sectional view in FIG. 7), wherein the sectional views in FIGS. 7F and 7G show outside-in filtration through the side walls of the hollow elements providing filtered fluid passing through the base outlet port 77 of the filter and the housing outlet 611.

FIGS. 8A-8F show another aspect of a filter 500 according to the invention, the filter having filter arms 100 having hollow non-rounded elements 50 (53), wherein portions of a filter arm can have linearly aligned hollow non-rounded elements and non-linearly aligned hollow non-rounded elements, wherein each element is connected to, and in fluid communication with, an adjacent element via a coordination point 58, the connected coordination points providing a hollow integral neck 60, wherein the filters include hollow transition elements 400 and wherein the base 75' includes a groove 78' in the side wall 76' and a resilient seal 79' in the groove. The side cross-section view in FIG. 8F shows outside-in filtration through the side walls 51 of the hollow elements providing filtered fluid passing through the base outlet port 77 of the filter.

FIGS. 9A-9F show a filter device 1000 according to another aspect of the invention, comprising the aspect of the filter 500 shown in FIG. 8A arranged in a housing 600 having housing inlets 610 (illustrated as inlet 610A and 610B) and a housing outlet 611 defining fluid flow paths from each housing inlet to the common housing outlet 611 with the filter 500 arranged in the housing across the two fluid flow paths (shown in more detail in the sectional view in FIG. 9E).

If desired, aspects of the invention can be utilized in closed and sterile systems. As used herein, the term "closed" refers to a system that allows the collection and processing (including filtration, and, if desired, the manipulation, e.g., separation of portions, separation into components, storage, and preservation) of fluid, without exposing the contents of the system to the environment in which it is being used. A closed system can be as originally made, or result from the connection of system components of sanitary fittings including sterile docking devices.

The hollow elements can have any suitable pore structure, e.g., a pore size (for example, as evidenced by bubble point, or by KL as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

The filter can have any desired critical wetting surface tension (CWST, as defined in, for example, U.S. Pat. No. 4,925,572). The CWST can be selected as is known in the art, e.g., as additionally disclosed in, for example, U.S. Pat.

Nos. 5,152,905, 5,443,743, 5,472,621, and 6,074,869. Typically, the filter element has a CWST of at least about 17 dynes/cm (about $17 \times 10^{-5}$ N/cm), for example, a CWST in the range of from about 17 dynes/cm to about 90 dynes/cm (about $17 \times 10^{-5}$ N/cm to about $90 \times 10^{-5}$ N/cm), more typically in the range of about 50 dynes/cm to about 60 dynes/cm (about $50 \times 10^{-5}$ N/cm to about $60 \times 10^{-5}$ N/cm).

The surface characteristics of the filter can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction.

The filter can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen.

In accordance with aspects of the invention, the filter can have a variety of configurations, including planar, and hollow cylindrical.

The filter, in some aspects comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer. Preferably, however, and as noted below, the housing can be manufactured by additive manufacturing, extrusion, and light polymerization.

Filters and filter elements according to aspects of the invention are preferably monolithic, preferably manufactured via additive manufacturing (sometimes referred to as "additive layer manufacturing" or "3D printing"). They are typically formed by repeated depositions of a metal powder bound together with an activatable binder (e.g., binder jetting, sometimes referred to as "drop on powder"), typically followed by agglomerating the powder, e.g., by sintering. Other suitable methods include extrusion (e.g., paste extrusion, fused filament fabrication and fused deposition modelling) and light polymerization (e.g., stereolithography apparatus (SLA), and digital light processing (DLP)).

In those aspects wherein the hollow base is made from the same material as the filter arms and transition element, the side wall(s) of the base will be porous, in those aspects wherein the hollow base is made from a different material than the filter arms and transition element, the side wall(s) of the base will typically be non-porous.

Housing and filter elements can be manufactured together via additive manufacturing in a continuous operation at substantially the same time.

Any suitable additive manufacturing equipment can be used, and a variety of production 3D printers are suitable and commercially available.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter comprising:
    (a) at least one filter arm comprising a plurality of hollow elements in fluid communication with each other, the hollow elements having porous walls, the at least one filter arm having a first end and a second end;
    (b) a hollow transition element comprising a collector having a porous side wall, a central cavity, an upper closed end and a lower open end; and at least one hollow transition element arm having a first transition arm end, a second transition arm end, and a porous side wall; wherein the first transition arm end is connected to, and in fluid communication with, the second end of the at least one filter arm; and the second transition arm is connected to the side wall of the collector, and is in fluid communication with the central cavity of the collector via at least one aperture in the side wall of the collector; and,
    (c) a hollow base having a side wall, and a base outlet port, wherein the hollow base is connected to, and in fluid communication with, the collector of the hollow transition element.

2. The filter of claim 1, comprising a plurality of filter arms, each filter arm having a first end and a second end; and a plurality of hollow transition element arms, each hollow transition element arm having a first transition arm end and a second transition arm end, each second end of a filter arm being connected to, and in fluid communication with, a first transition arm end; each second transition arm end being connected to the side wall of the collector and in fluid communication with the central cavity of the collector via an aperture in the side wall of the collector.

3. The filter of claim 1, wherein the filter arms include linearly arranged adjacent hollow elements and/or non-linearly arranged hollow elements.

4. The filter of claim 1, wherein the hollow elements have a rounded shape.

5. The filter of claim 4, wherein the hollow elements have a spherical shape.

6. The filter of claim 1, wherein the hollow elements have a non-rounded shape.

7. The filter of claim 1, comprising hollow elements having different shapes and/or different diameters and/or different wall thicknesses.

8. The filter of claim 1, wherein at least one filter arm comprises two or more hollow elements having different shapes and/or different diameters and/or different wall thicknesses.

9. A filter device comprising a housing having at least one inlet and at least one outlet, defining at least one fluid flow path between the at least one inlet and the at least one outlet, with the filter of claim 1 arranged in the housing across the at least one fluid flow path.

10. A method of filtration, the method comprising passing the fluid through the filter of claim 1.

11. The filter of claim 2, wherein the hollow elements have a rounded shape.

12. The filter of claim 3, wherein the hollow elements have a rounded shape.

13. The filter of claim 2, wherein the hollow elements have a non-rounded shape.

14. The filter of claim 3, wherein the hollow elements have a non-rounded shape.

15. The filter of claim 2, comprising hollow elements having different shapes and/or different diameters and/or different wall thicknesses.

16. The filter of claim 3, comprising hollow elements having different shapes and/or different diameters and/or different wall thicknesses.

17. The filter of claim 4, comprising hollow elements having different shapes and/or different diameters and/or different wall thicknesses.

18. The filter of claim 5, comprising hollow elements having different shapes and/or different diameters and/or different wall thicknesses.

19. The filter of claim 6, comprising hollow elements having different shapes and/or different diameters and/or different wall thicknesses.

20. The filter of claim 2, wherein at least one filter arm comprises two or more hollow elements having different shapes and/or different diameters and/or different wall thicknesses.

* * * * *